(12) United States Patent
Hardebeck et al.

(10) Patent No.: US 7,847,755 B1
(45) Date of Patent: Dec. 7, 2010

(54) METHOD AND APPARATUS FOR THE IDENTIFICATION AND SELECTIVE ENCODING OF CHANGED HOST DISPLAY INFORMATION

(75) Inventors: Ed Hardebeck, Brookline, MA (US);
Claudio Topolcic, Concord, MA (US);
Richard L. Baker, Belmont, MA (US)

(73) Assignee: Glance Networks, Arlington, MA (US)

( * ) Notice: Subject to any disclaimer, the term of this patent is extended or adjusted under 35 U.S.C. 154(b) by 1242 days.

(21) Appl. No.: 11/355,852

(22) Filed: Feb. 16, 2006

Related U.S. Application Data

(60) Provisional application No. 60/683,740, filed on May 23, 2005.

(51) Int. Cl.
G09G 5/00 (2006.01)

(52) U.S. Cl. .................. 345/2.2; 345/2.1; 709/231; 709/236

(58) Field of Classification Search .............. 709/231, 709/236; 345/2.1, 2.2
See application file for complete search history.

(56) References Cited

U.S. PATENT DOCUMENTS

| | | | | |
|---|---|---|---|---|
| 4,982,285 A | * | 1/1991 | Sugiyama | 375/240.12 |
| 5,086,402 A | * | 2/1992 | Sterling, II | 709/246 |
| 5,235,419 A | * | 8/1993 | Krause | 375/240.16 |
| 5,526,479 A | * | 6/1996 | Barstow et al. | 345/473 |
| 5,644,406 A | * | 7/1997 | Harrington et al. | 382/239 |
| 5,828,848 A | * | 10/1998 | MacCormack et al. | 709/247 |
| 6,122,320 A | * | 9/2000 | Bellifemine et al. | 375/240 |
| 6,225,922 B1 | | 5/2001 | Norton | |
| 6,819,271 B2 | | 11/2004 | Geiger | |
| 6,968,012 B1 | * | 11/2005 | Meggers | 375/240.24 |
| 7,403,566 B2 | * | 7/2008 | Hutler et al. | 375/240.25 |
| 7,432,934 B2 | * | 10/2008 | Salazar et al. | 345/522 |
| 2002/0057295 A1 | * | 5/2002 | Panasyuk et al. | 345/804 |
| 2006/0020710 A1 | * | 1/2006 | Rabenold et al. | 709/236 |
| 2006/0069794 A1 | * | 3/2006 | Gorog et al. | 709/231 |

* cited by examiner

*Primary Examiner*—William L Bashore
*Assistant Examiner*—Gregory A Distefano
(74) *Attorney, Agent, or Firm*—Anderson, Gorecki & Manaras LLP

(57) ABSTRACT

Changed Host Display Information (HDI) may be captured, selectively encoded, and optionally transmitted between participants over a session. Hints indicative of which portions of the HDI may have changed are collected and used to select areas of HDI for processing. Changed HDI is encoded using an encoding process selected from a number of encoding processes by determining which process is likely to efficiently encode that portion of the HDI. Where the HDI is divided into tiles for processing the encoding method selection may take place on a tile-by-tile basis, for example by counting the number of colors in the tile to be encoded. Changed HDI may be transmitted to viewers using paint commands containing pixel information and copy commands indicating that a portion of the HDI has been moved.

17 Claims, 17 Drawing Sheets

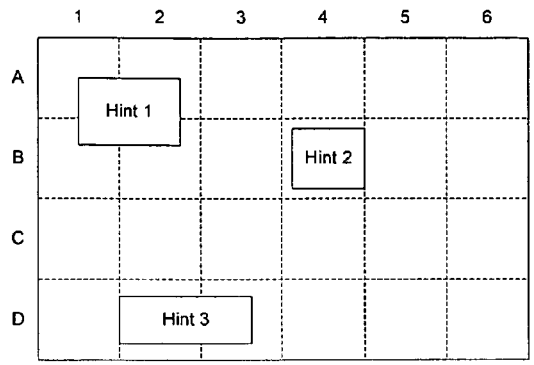
Figure 10A
Figure 10B
| Hint | Tiles |
|---|---|
| 1 | A1, A2, B1, B2 |
| 2 | B4 |
| 3 | D2, D3 |
Figure 10C
| Hint | Tiles |
|---|---|
| 1 | A1, A2, B1, B2 |
| 3 | D2, D3 |
| 2 | B4 |
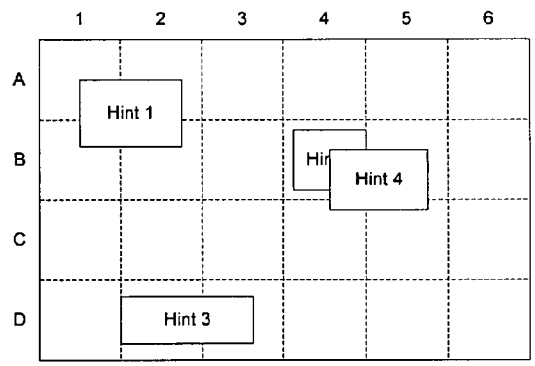
Figure 11A
Figure 11B
| Hint | Tiles |
|---|---|
| 1 | A1, A2, B1, B2 |
| 2 | B4 |
| 3 | D2, D3 |
| 4 | B4, B5, C4, C5 |
Figure 11C
| Hint | Tiles |
|---|---|
| 1 | A1, A2, B1, B2 |
| 3 | D2, D3 |
| 4 | B4, B5, C4, C5 |
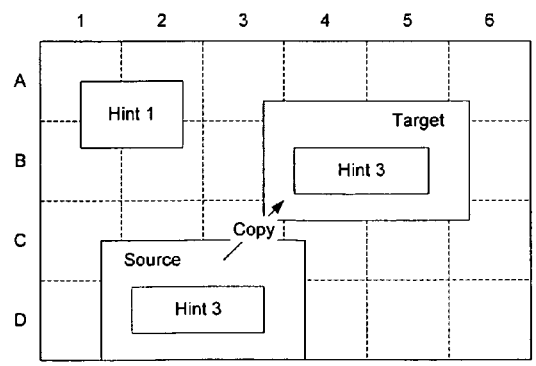
Figure 12A
Figure 12B
| Hint | Tiles |
|---|---|
| 1 | A1, A2, B1, B2 |
| 2 | B4 |
| 3 | D2, D3 |
| 4 | B4, B5, C4, C5 |
| Copy | C1-C4 D1-D4 |
Figure 12C
| Hint | Tiles |
|---|---|
| 1 | A1, A2, B1, B2 |
| 3 | B4, B5 |
| 4 | C4, C5 |
| Copy | C1-C4 D1-D4 |

Figure 13
Capture Flags

|   | 1 | 2 | 3 | 4 | 5 | 6 | 7 | 8 |
|---|---|---|---|---|---|---|---|---|
| A | 1 | 1 | 1 | 0 | 0 | 0 | 0 | 0 |
| B | 1 | 1 | 1 | 1 | 0 | 0 | 0 | 0 |
| C | 1 | 0 | 1 | 1 | 0 | 0 | 0 | 0 |
| D | 0 | 0 | 0 | 0 | 0 | 0 | 0 | 0 |
| E | 0 | 0 | 0 | 0 | 0 | 0 | 0 | 0 |
| F | 0 | 0 | 0 | 0 | 0 | 0 | 0 | 0 |

Figure 14
Tile Processing Flags

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| A | 1 | 1 | 1 | 1 | 1 | 1 | 0 | 0 | 0 | 0 | 0 | 0 | 0 | 0 | 0 | 0 |
| B | 1 | 1 | 1 | 1 | 1 | 1 | 0 | 0 | 0 | 0 | 0 | 0 | 0 | 0 | 0 | 0 |
| C | 1 | 1 | 1 | 1 | 1 | 1 | 1 | 1 | 0 | 0 | 0 | 0 | 0 | 0 | 0 | 0 |
| D | 1 | 1 | 1 | 1 | 1 | 1 | 1 | 1 | 0 | 0 | 0 | 0 | 0 | 0 | 0 | 0 |
| E | 1 | 1 | 0 | 0 | 1 | 1 | 1 | 1 | 0 | 0 | 0 | 0 | 0 | 0 | 0 | 0 |
| F | 1 | 1 | 0 | 0 | 1 | 1 | 1 | 1 | 0 | 0 | 0 | 0 | 0 | 0 | 0 | 0 |
| G | 0 | 0 | 0 | 0 | 0 | 0 | 0 | 0 | 0 | 0 | 0 | 0 | 0 | 0 | 0 | 0 |
| H | 0 | 0 | 0 | 0 | 0 | 0 | 0 | 0 | 0 | 0 | 0 | 0 | 0 | 0 | 0 | 0 |
| I | 0 | 0 | 0 | 0 | 0 | 0 | 0 | 0 | 0 | 0 | 0 | 0 | 0 | 0 | 0 | 0 |
| J | 0 | 0 | 0 | 0 | 0 | 0 | 0 | 0 | 0 | 0 | 0 | 0 | 0 | 0 | 0 | 0 |
| K | 0 | 0 | 0 | 0 | 0 | 0 | 0 | 0 | 0 | 0 | 0 | 0 | 0 | 0 | 0 | 0 |
| L | 0 | 0 | 0 | 0 | 0 | 0 | 0 | 0 | 0 | 0 | 0 | 0 | 0 | 0 | 0 | 0 |

(Time T1)

(Time T2)

(Time T3)

(Time T4)

(Time T5)

(Time T6)

METHOD AND APPARATUS FOR THE IDENTIFICATION AND SELECTIVE ENCODING OF CHANGED HOST DISPLAY INFORMATION

CROSS REFERENCE TO RELATED APPLICATIONS

This Application claims priority to U.S. Provisional Patent Application No. 60/683,740, filed May 23, 2005, entitled METHOD AND APPARATUS FOR USE IN CONNECTION WITH VISUAL INFORMATION SYSTEMS, the content of which is hereby incorporated herein by reference. This application is also related to U.S. patent application entitled METHOD AND APPARATUS FOR THE TRANSMISSION OF CHANGED HOST DISPLAY INFORMATION filed on even date herewith, and to U.S. patent application entitled METHOD AND APPARATUS FOR REDUCING THE AMOUNT OF INFORMATION THAT MUST BE TRANSMITTED TO SLOWER VIEWERS OVER A REMOTE VIEWING SESSION also filed on even date herewith, the content of each of which is hereby incorporated by reference.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND

1. Field

The field relates to visual information systems and, more particularly, to the identification and selective encoding of changed host display information, optionally for transmission to one or more geographically dispersed viewers.

2. Description of the Related Art

Telephones enable people to communicate verbally, but do not enable participants to a telephone call to exchange visual information with each other. Conventionally, when visual information such as a PowerPoint (™Microsoft Corporation) presentation or a document was to be referenced during a telephone conversation, the visual information would be faxed, e-mailed, or otherwise physically sent to the participants so that the participants could have the reference materials available during the telephone call.

As technology evolved, software was developed to allow information being shown on a host's display (host display information), such as a computer monitor screen, to be made visible on another display at a geographically dispersed location. Software of this nature will be referred to herein as "Remote Viewing Software" (RVS).

FIG. 1 illustrates an example of a typical way in which remote viewing of host display information may take place. As shown in FIG. 1, a host participant 10 may desire to allow host display information 12 appearing on a host display 14 associated with a host machine 16, to be made available to a viewer participant 18. To do so, RVS software 20 on the host machine 16 will capture the host display information 12 and pass it over a network 22 to a viewer machine 24. An instantiation of the RVS software 26 (which may be the same as RVS software 20 or a limited version of RVS software 20) will decode the received host display information to generate viewer display information 28 that will be caused to appear on the viewer display 30. A remote viewing service 32 may be provided to support viewing sessions on the network. A combination of the host machine and host display will collectively be referred to herein as a "host" 34. The host machine and host display may be separate devices or integrally formed. Similarly, a combination of a viewer machine and viewer display will collectively be referred to herein as a "viewer" 36. The viewer machine and viewer display may be separate devices or integrally formed.

By looking at the viewer display information 28 on the viewer display 30, the viewer participant 18 may thus see a reproduction of the host display information 12 on the viewer display 30. A remote viewing session over which the host display information is transmitted may be hosted by the host machine 16 or, optionally, the remote viewing service 32 may assume a portion of the tasks required to host the session.

When the system of FIG. 1 is in use, the host participant may cause a desired visual presentation to appear on the viewer display 30 simply by causing the desired visual presentation to appear as part of the host display information on the host display. Since the host participant 10 is able to control the host and hence the content that is used to form the host display information, the host participant may control the content that is made to appear on the viewer display. Reference may then be made to the shared host display information to enable more effective communication to take place between the host participant and viewer participants.

Remote Viewing Software (RVS) tools vary significantly in their complexity. For example, some RVS tools require all participants to have special purpose RVS software installed on their machines, firewalls custom configured to enable traffic to pass over the networks, and require extensive training. Other RVS tools are much simpler to use, such as the RVS tool developed by Glance Networks™, which allows a remote viewing session to be created using RVS software 20 on the host machine 16, and allows the RVS software 26 on the viewer machine 24 to be run in a Java-enabled Internet browser or native code viewer on the viewer machine 24. Other companies have developed similar RVS tools as well, such as WebEx™, PictureTel™, Citrix™, and Raindance™, and Glance Networks' RVS tool is described herein merely as an example of an RVS tool.

Since transmission of host display information may require transmission of a significant amount of data, RVS software 20 may encode the host display information for transmission over the network 22. The RVS software 26 will then decode the received information for display on the viewer display 30. One available encoder/decoder (codec), which has been implemented, for example in the Glance Networks RVS tool, is a software codec known as Virtual Network Computing (VNC)™.

The VNC codec was initially designed to be used in a one to one scenario, where one viewer was to be allowed to connect to a RVS session to receive host display information. Although the VNC software can be used in a one to many scenario, where multiple viewers are provided with access to the host display information, the VNC software was not initially designed to do so and, hence, is not optimized to create connections between the host and multiple viewers. Given the limitations of the VNC software and other available codecs, it would be advantageous to provide a new method and apparatus for the identification and encoding of changed visual display information, optionally for transmission to one or more geographically dispersed displays. Additionally, it would be advantageous to provide a new method and apparatus for the transmission of changed host display information to one or more geographically dispersed displays.

Different viewers have different abilities to receive information, for example where the network conditions or machine capabilities limit a receiver's ability to receive updates. Accordingly, it is desirable to allow the different viewers to receive information at different rates.

There are several conventional techniques that may be used to enable viewers to receive updates at different rates. For example, the host may send two streams of data to the server—a fast stream and a slow stream—and the server may serve the viewers with the appropriate stream depending on their connection to the server, the network conditions, the rate at which information is requested and other factors. Where more than two speeds are to be supported, the host may send more than two streams of data. Requiring the host to send more than one stream of data, however, requires the host to have sufficient bandwidth available to transmit the multiple streams of data and sufficient processing power to compute the multiple streams.

Another example of how viewers may be provided with updates at different rates is to have the host send a high quality stream of encoded data at a first, high bandwidth rate, and have the data transcoded by the remote viewing service. Transcoding in this example involves decoding the data from the viewer and re-encoding the data multiple times to create several available streams of data that may be output to the viewers at different rates. This method requires considerable processing resources at the server, since the server is required to decode the data and re-encode the data multiple times (up to once for each transmission stream). Since particular types of encoding result in losses to the picture quality, causing the image to be encoded twice exacerbates the losses of the encoding procedure. Thus, depending on the implementation, transcoding may result in relatively poor image quality. Additionally, decoding and re-encoding increases the latency of the transmission process since it requires the remote viewing service to perform additional operations on the data before transmission of the data can occur to the viewers.

A third way to allow the viewers to be provided with updates at different rates is to use progressive coding in which the coding is layered to enable an hierarchical reconstruction to take place. Layered coding or hierarchical coding is a technique developed for scalable video delivery, in which the signal is separated into components of differing visual importance. The basic concept with layered coding is that each video component, or layer, can be coded and transferred according to its importance. Vital layers may thus be transferred first and other layers, which merely enhance the image quality, could be sent if sufficient bandwidth is available. Using this type of coding, important aspects of the signal may be transmitted to all participants while less important aspects may be transmitted to participants with higher bandwidth capabilities.

While the several available techniques all enable different amounts of information to be provided to different viewers, given their limitations, it would be advantageous to provide another way in which the amount of information transmitted to viewers on a session could be adjusted depending on the capabilities of the individual viewers.

SUMMARY

Host display information may be captured, selectively encoded, and optionally transmitted between participants over a session directly or in connection with a remote viewing service. To reduce the amount of information that must be transmitted on a given session, only portions of the host display information that have changed are selected to be transmitted from the host to the viewers. Portions that are unchanged are not transmitted, as it may be assumed that the viewers are in possession of the non-changed information due to previous transmissions.

To determine which portions of the host display information have changed, the host collects hints indicating which portions of the host display are likely to have changed. The hints are stored in a hint queue and processed upon receipt of an update request. Optionally, the hints may be moved to a consolidated hint queue in connection with hint processing to consolidate and reorganize the hints to allow them to be more efficiently processed.

To process hints, the host display information associated with the portion of the host display relevant to the hint is captured and compared with a previous version of the host display information. If there is a difference between the captured host display information and previous host display information, the changed portions of the host display information will be encoded using an encoding process selected for that portion of the host display information. Each tile or group of tiles that is to be encoded for transmission may be encoded using an encoding method selected from a plurality of available methods on an individual basis. Selecting encoding methods on a per-tile basis allows the host display information in the tile to be encoded for transmission using an encoding method that is more likely to be able to effectively encode that portion of the host display information contained in the tile. One way of selecting an encoding method is to count the number of colors in the tile to be encoded. The encoded information may then be transmitted to the viewers.

Changes that are detected in connection with processing host display information will cause update commands to be generated. The update commands may be paint commands, which contain information derived from the host display information and from which pixel data may be obtained, and copy commands, which are configured to indicate that a portion of the host display information has been moved from one place to another. One or more update commands may be included in an update message for transmission to the viewers. A collection of update messages forms an update. A bounding rectangle construct may be used to convey positional information associated with the update or content of the update message.

Updates may be transmitted over a remote viewing session using a transmission protocol configured to allow sessions to be established, terminated, and used by participants. The transmission protocol provides a message structure that may be used to exchange administrative information associated with the session, as well as host display information to be transmitted from the host to the viewers over the session. The messages may be passed directly between the host and viewers or may be passed between the host and server and between the server and viewers. The messages also may be used to allow viewers to highlight information on the display for a limited period of time so that the highlighting appears to the host and optionally to the other viewers on the session.

Viewers may have different network and processing capabilities which may affect the frequency with which they are able to receive information. To accommodate different viewer capabilities, update commands may be maintained in an update queue at the server and distributed to viewers according to the viewers' abilities to receive them. As update commands arrive that supersede older update commands, the new update commands may cause the old update commands to be removed from the queue so that the older update commands may be pruned from the update queue. Where the pruned update messages have not yet been sent to the slower viewers, pruning the older update commands from the update queue enables information that will quickly be replaced via another update command to be selectively not transmitted to slower viewers. In this manner, different numbers of update commands may be provided to different viewers depending on their abilities, without requiring transcoding of the update commands, multiple tier encoding, or the use of multiple transmission streams by the host. A pane construct may be used to keep track of which updates are required to be maintained in the queue and which may be pruned from the queue.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIGS. 10A, 11A, and 12A are logical views of a host display illustrating hints, FIGS. 10B, 11B, and 12B are views of a hint queue illustrating how the hint queue changes as hints are received, and FIGS. 10C-12C are views of a consolidated hint queue illustrating how hints may be consolidated prior to processing, according to an embodiment of the invention;

FIG. 13 is functional block diagram an array of capture flags indicating which portions of the screen have been captured for processing according to an embodiment of the invention;

FIG. 14 is functional block diagram an array of tile processing flags illustrating which tiles have been processed according to an embodiment of the invention;

FIGS. 19A, 20A, and 21A are functional block diagrams illustrating example updates that may be received from a host; FIGS. 19B, 20B, and 21B are functional block diagrams illustrating panes that may be created as a result of the updates illustrated in FIGS. 19A, 20A, and 21A; and FIGS. 19C, 20C, and 21C illustrate the update queue as the updates are received'

DETAILED DESCRIPTION

The following detailed description sets forth numerous specific details to provide a thorough understanding of one or more embodiments of the invention. However, those skilled in the art will appreciate that the invention may be practiced without these specific details. In other instances, well-known methods, procedures, components, protocols, algorithms, and circuits have not been described in detail so as not to obscure the invention.

The following description will be broken into four parts. The first part will provide an overview of several example RVS systems, the second part will focus on a method and apparatus for the identification and selective encoding of changed host display information; the third part will focus on a method and apparatus for the transmission of changed host display information; and the fourth part will focus on a method and apparatus for reducing the amount of information that must be transmitted to slower viewers over a remote viewing session.

Part I

Overview of Example RVS Systems

One example of a remote viewing system will be described initially to explain in greater detail an environment in which the invention may be implemented. The invention is not limited to implementation in this particular described remote viewing system, however, as aspects of the invention may be used in many different systems and in other types of software unrelated to remote viewing. Additionally, although the invention will be described as being implemented in software, hardware components may be used to implement embodiments of the invention as well, or particular portions of the disclosed invention, and the invention is thus not limited to a software implementation.

Figure 1:
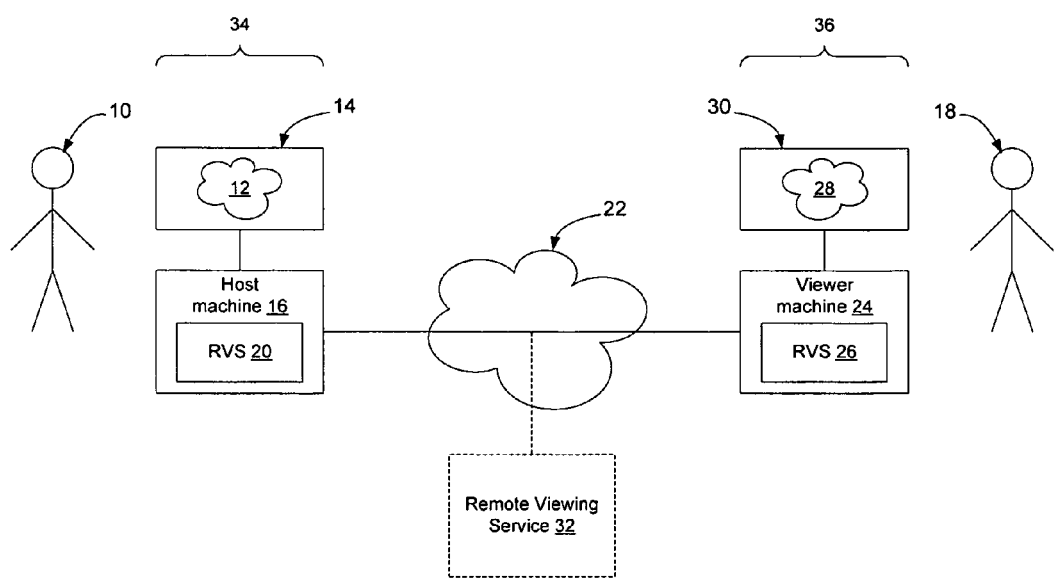
FIG. 1 is a functional block diagram illustrating the participants to a remote viewing session.
Figure 2:
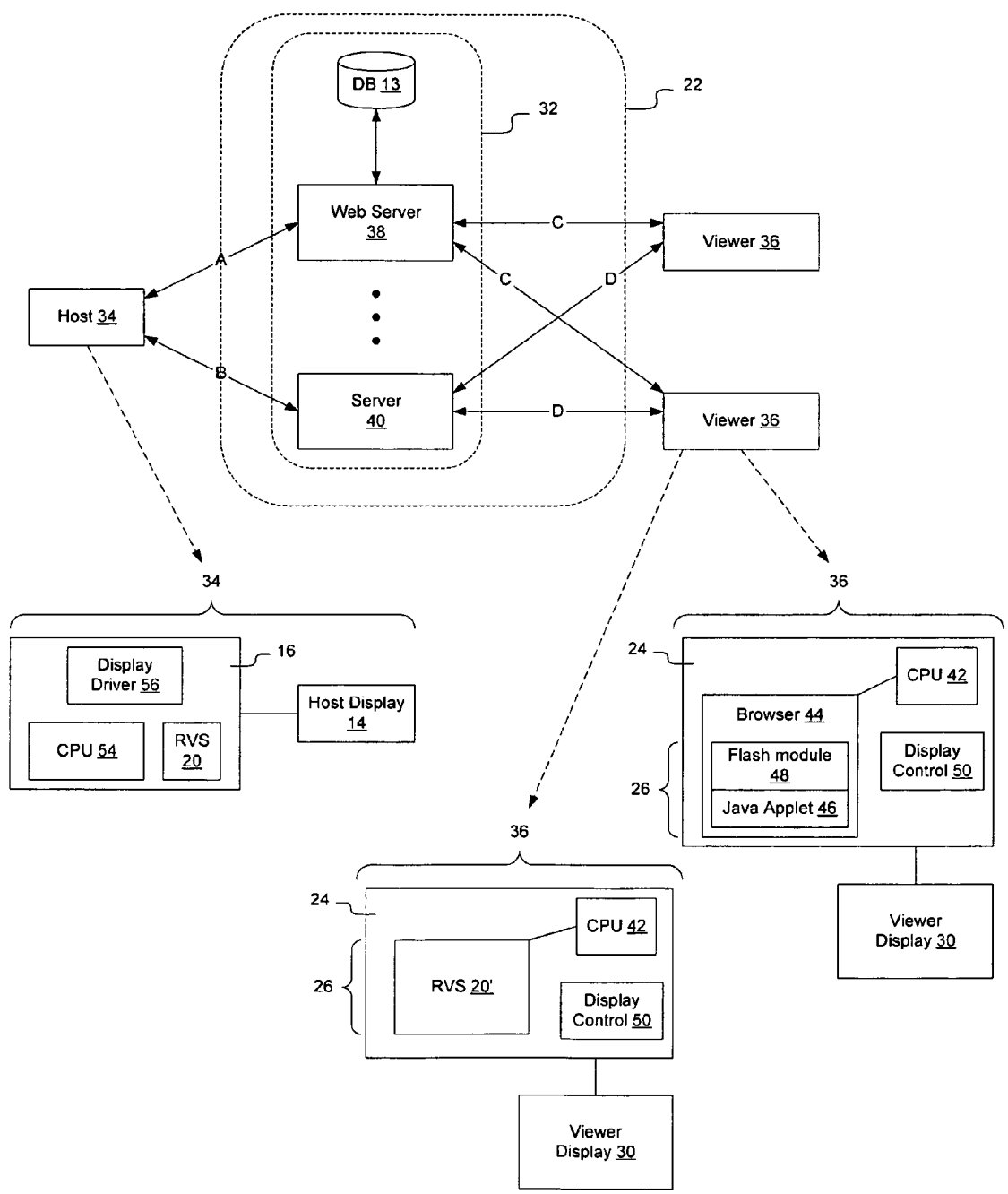
FIG. 2 is a functional block diagram illustrating a network environment that may be used to exchange host display information according to an embodiment of the invention.

FIG. 1, described briefly above, illustrates the basic interconnection of the host 34 and viewer 36 to enable remote viewing of the host display information 12 on the viewer display 30. FIG. 2 illustrates an example of an implementation in which the remote viewing service 32 is used to perform several of the host functions to thereby facilitate the creation of, and use of, remote viewing sessions over the network. As shown in FIG. 2, the host 34 and viewers 36 may be connected over the Internet or other network infrastructure 22 to enable sessions to be established, so that viewers 36 may be provided with a representation of the host display information 12. FIG. 2 will be used to describe aspects of operation of the remote viewing service. The invention is not limited to the use of a particular architecture to implement a remote viewing service, however, as the remote viewing service 32 may be implemented in many different ways. For example, FIGS. 3 and 4, discussed below, provide additional examples of how the remote viewing service 32 may be implemented on a network-wide basis. Thus, the invention is not limited to operate in the example environment illustrated in FIG. 2.

The remote viewing service 32, in this example, includes one or more servers 38, 40 configured to provide an environment over which remote viewing sessions may occur. For example, in the illustrated embodiment, the remote viewing service 32 has a web server 38 configured to provide an environment in which web pages may be created for hosts 34, and through which viewers 36 can connect to RVS sessions associated with the hosts 34. Additional details about RVS session initiation and access are provided below. Once the RVS session has been established, data transfer between the hosts 34 and the viewers 36 may be supported by the web server 38 or by another server 40 associated with the remote viewing service 32. The remote viewing service 32 may be architected in many different ways depending on the expected number of sessions, the expected location of participants, and level of involvement of the service, and whether the remote viewing service is to be deployed on a public network such as the Internet or is to be deployed in a more controlled environment such as a private network.

A viewer 36 may access a session using a viewer machine 24 such as a computer or another access device having a CPU 42 configured to provide an environment to support execution of a browser such as an Internet browser 44. To enable session information to be decoded and reassembled by the viewer machine 24, a small piece of code such as a Java Applet 46 or Flash™ module 48 (available from Macromedia Corporation) may be instantiated in the viewer machine 24 to be executed in connection with in the viewer's browser 44. Optionally, the Java applet 46 may be downloaded and installed to the viewer machine automatically when the viewer 36 connects to a session so that the viewer participant 18 need not manually install software to obtain access to the session. Information received over a session will be decoded by the Java applet 46 or Flash module 48, and used in connection with a display controller 50 to cause a representation of the host display information 12 to appear on the viewer display 30.

Optionally, where the viewer machine 36 is provided with more than one codec, for example where the viewer machine 36 has both a Java applet and a Flash module decoder, the format of the information transferred over the session may change with network conditions. For example, the system may initially attempt to connect viewers to the session using Flash, then using the Java applet, and then using custom RVS software. To support a session, a download of the Java applet or other code may be required of the viewer.

Alternatively, the RVS software 20' implemented on the viewer machine 24 may be an instance of the RVS software 20 that is utilized by the host 34 to create a session. In this embodiment, the viewer 36 may access the content associated with a session directly using a decoder built into the RVS software 20'.

On the host side, a host 34 generally includes a host display 14 that is electronically controlled via a host machine 16, which may be a computer or other electronic device. The host machine 16 generally includes a CPU 54 configured to control a display driver 56 to allow selected information that is generated in the host machine 16 to be shown on the host display 14. An instance of RVS software 20 is also instantiated on the host machine 16 to allow information displayed on the host display 14 to be identified and selectively encoded, optionally for transmission over a session being supported by the remote viewing service 32.

To create a session, the RVS software 20 on the host machine is invoked. Where the session is to be supported by the remote viewing service 32, the RVS software 20 will contact the remote viewing service 32 to establish the session. For example, the RVS software 20 will communicate with one of the web servers 38 associated with the remote viewing service 32 to initiate a session (Arrow A). Session initiation may include authentication, establishing authorization with the server, and setting up accounting entries for the session. Encryption parameters may also be negotiated at this stage.

Once the host 34 has completed the session initiation process with the server 38, a passcode for the session will be generated (either automatically by the server or in connection with host input). The passcode will be used to allow viewers 36 to join the session to prevent unauthorized viewers from accessing the session. Multiple forms of session access control may be used and the invention is not limited to the use of any particular form of session access control. During the session, the host 34 will transmit updates of the host display information to the server(s) (Arrow B) which will then be made available to the viewers 36 over the session. Details relating to generation of updates and transmission of updates messages are provided in greater detail below. The same server may be used to perform session initiation and to support the session, or alternatively, as illustrated, different servers 38, 40 may be used.

To join a session, a viewer 36 communicates with the host 34 e.g. via e-mail, telephone, or instant messaging, and obtains the access information associated with the session. For example, the access information may be a Uniform Resource Locator (URL) associated with the web site that will be used to support the session and which may be used by the browser 44 to locate the session on the network 22, and a passcode that was generated during the initiation process discussed above. The viewer 36 then can use its browser 44 to locate the URL on the network, enter the passcode to authenticate with the remote viewing service 32, and connects to the session (Arrow C). If necessary, the Java applet 46, Flash module 48, or RVS software 20', may be downloaded as part of the process of joining the session, or when the browser 44 accesses the website associated with the URL.

During a session, host display information is transmitted to the viewer 36 from the remote viewing service 32 that is hosting the session (Arrow D). The RVS viewer software 26 contains a codec that is used to decode the information received over the session. The content received over the session may be used to cause a representation of the host display information to be recreated on the viewer display 30. If the viewer 36 already has an instance of RVS software 20' installed, instantiation of the applet optionally may be omitted since the RVS software 20' optionally may be configured to include the requisite software required to decode the encoded host display information. Multiple viewers 36 may join a given session using this procedure.

Figure 3:
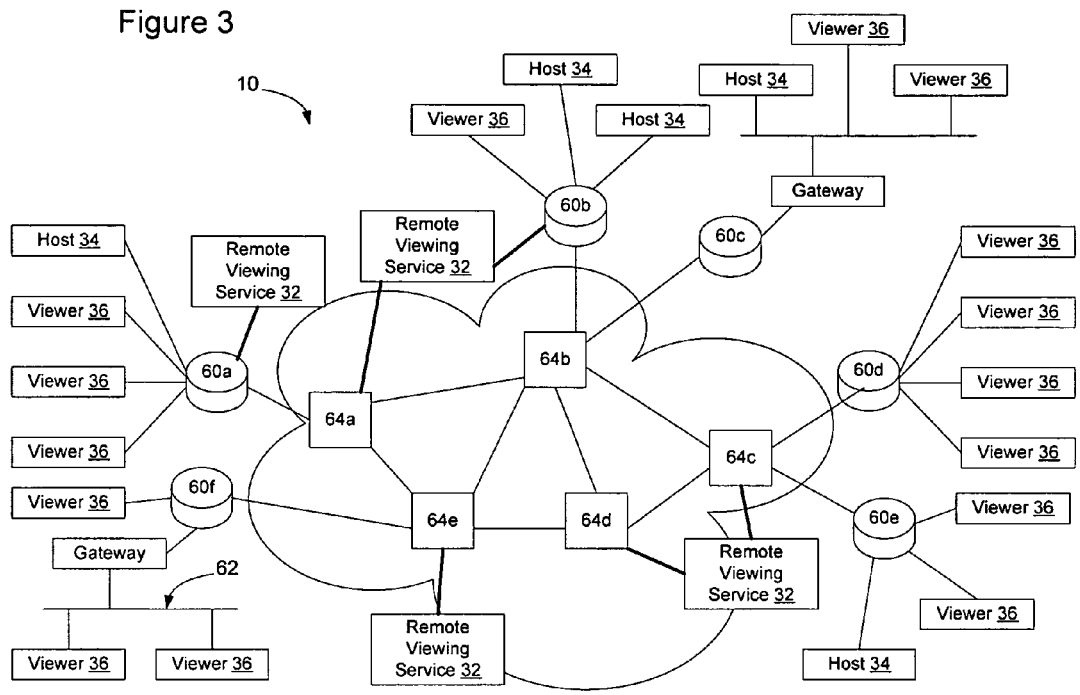
FIG. 3 is a functional block diagram of a network environment supporting a remote viewing service according to an embodiment of the invention.

FIG. 3 illustrates a network topography in which multiple instances of the remote viewing service 32 are instantiated on a network 22. As shown in FIG. 3, the network may have edge network elements 60a-60f configured to interface with hosts 34 and viewers 36 or with local area networks 62 encompassing the hosts and viewers. The network may also include high-speed core network elements 64a-64e configured to provide high-speed telecommunication channels between edge network elements 60a-60f. The edge and core network elements may be routers, switches, bridges, or other common networking elements. Other network elements may be included as well depending on the intended configuration of the network.

As shown in FIG. 3, the remote viewing service 32 may be connected to the edge network elements 60, may be connected directly to the core network elements 64, or may be connected to both. Optionally, the remote viewing service 32 may be provided in connection with a Virtual Private Network (VPN) server, to allow remote viewing services to be integrated with VPN services on the network, although the invention is not limited in this manner. Additionally, although the remote viewing service has been illustrated as being deployed separate from the network elements, the remote viewing service 32 may be deployed as a web service process on one or more of the network elements to enable the remote viewing service to be integrated with operation of the network to thereby accelerate handling of data flows associated with sessions on the network.

Figure 4:
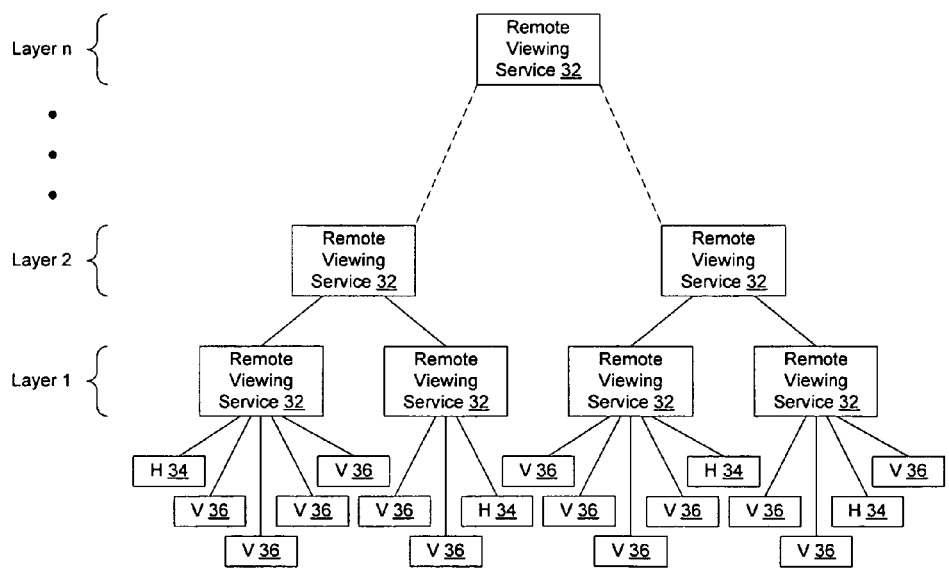
FIG. 4 is a functional block diagram illustrating an hierarchical remote viewing service.

In the embodiment of FIG. 3, the relationship of the instances of the remote viewing services to each other has not been specified. The remote viewing service instances may be considered peers on the network with each service operating independent of the other services or, alternatively, the services may be hierarchically arranged, for example as shown in FIG. 4. In an hierarchical arrangement, the remote viewing services in the lowest layer (layer 1) could be configured to handle aggregation of client traffic, and to forward the aggregated traffic to higher layers of the service as required. This may be used, for example, to enable larger sessions to take place with the lower layers being configured to attach viewers to the sessions and the upper layer(s) being used to distribute content from the host toward the viewers. Alternatively, different layers of the remote viewing service could be used to perform different aspects of the several functions associated with the remote viewing service 32. For example, the upper layers may be used to establish sessions while the lower layers may be configured to handle traffic on established sessions. Many different ways of organizing the remote viewing service may be developed and the invention is not limited to any particular way of organizing the portions of the remote viewing service.

Figure 5:
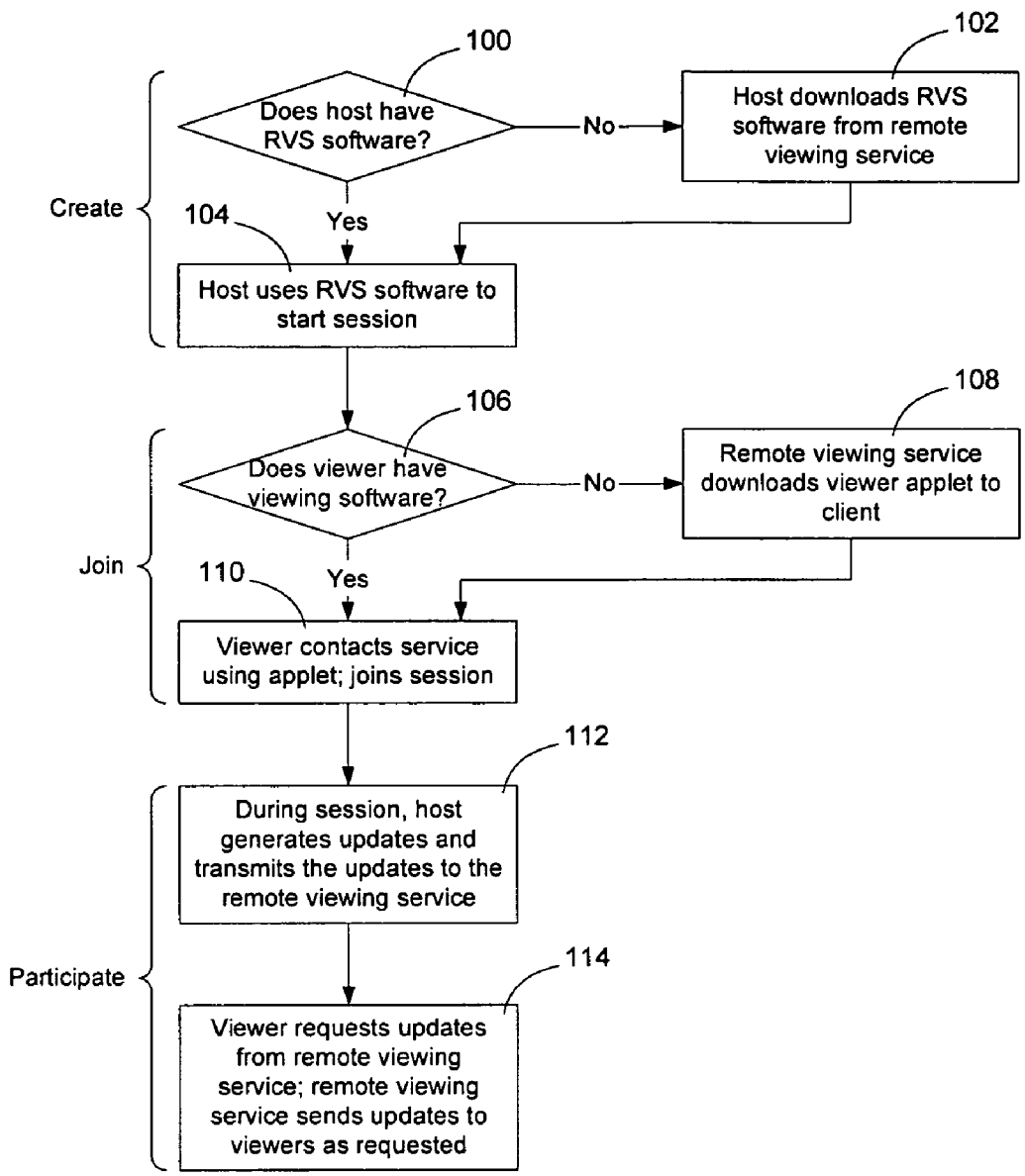
FIG. 5 illustrates a process of establishing, joining, and participating in a remote viewing session using a RVS tool configured to implement an embodiment of the invention.

FIG. 5 illustrates a flow chart of an overview of a process that may be used to create a session by a host 34, join the session by a viewer 36, and allow hosts and viewers to participate in the session. As shown in FIG. 5, when a host 34 seeks to create a session, the host 34 will contact the RVS system 32, and the RVS system 32 will determine if the host 34 has the requisite RVS software (100). If the host does not have the requisite software 20, or the software on the host machine 16 is not up-to-date, the host 34 will be prompted to download the requisite software, such as an upgraded version of the RVS software tool 20 or an initial version of the RVS software tool 20 using an appropriate software licensing process (102). Once the host has the necessary software, it will use the software to start a session (104).

When a viewer 36 seeks to join a session, it will contact the remote viewing service 32 and the remote viewing service 32 will determine if the viewer 36 has the necessary decoding software 26 (106). If the viewer does not have the requisite software or if the viewer's software 26 is an older version, the remote viewing service 32 will cause the software to be loaded onto the viewer's computer (108), optionally using an appropriate licensing process. The software may be loaded from one of the servers associated with the remote viewing service 32 or, alternatively, may be caused to be downloaded from another place on the network 22.

Once the software 26 exists at the viewer (110) the viewer 36 will be allowed to join the session, provided the viewer has the correct URL and is able to supply the requisite passcode information. During the session, the host generates updates and sends the updates to the remote viewing service (112). As viewers request updates from the remote viewing service, the remote viewing service will pass the updates or information derived from the updates to the viewers (114). The manner in which updates are created, transmitted, and managed, will be described in greater detail below.

The RVS software may be used alone or in combination with a voice transmission technology such as a telephone to enable a multi-media exchange to occur between the host and viewers. The software may also be used in connection with other technologies, such as IP telephones, videoconferencing systems, an instant messaging system, electronic mail, and other similar systems as well.

Embodiments of the invention may be used in many existing and to be designed software systems where it is advantageous to identify, encode, and optionally transmit host display information. Examples of displays 14, 30 that may be associated with the host 34 and viewer 36 include computer monitors, lap-top computer screens, tablet PC screens, hand-held computer screens, Palm type hand-held devices, wireless telephone or other hand-held devices containing video screens, over-head projectors and other types of projectors or other large displays configured to project or present images for public display, televisions, electronic white boards, or other types of equipment configured to provide visual information. The invention is not limited to the use of any particular type of display by the host or viewer.

Additionally, although an environment has been described in which the RVS software is implemented on a host machine and a remote viewing service 32 is provided to support RVS sessions, the invention is not limited in this manner as the functions performed by the remote viewing service 32 may be implemented as processes on the host to allow the host 34 to directly communicate with viewers 36. Additionally, in the following description, it will be assumed that the host display information is to be relatively quickly consumed, i.e. that the host display information is part of a real-time presentation and is to be experienced by the viewer participants in real time. The invention is not limited in this manner, however, as the system may also be used to generate image data for long term storage and future playback and optionally for other uses.

Part II

Display Capture and Encoding

As described in greater detail below in this Part II, host display information may be captured and selectively encoded, and optionally transmitted between participants directly or in connection with a remote viewing service 32. Embodiments of the invention may be used in connection with the previously described RVS system or in connection with other applications.

Overview of Encoding and Capture

Although the host display information (such as pixel data) could be directly output from the host 34 and transmitted over the network 22, bandwidth restrictions either associated with the host's network connection or a viewer network connection generally make it desirable to reduce the amount of information that must be transmitted between participants on a session. To reduce the amount of information that must be transmitted on a given session, only portions of the host display information that have changed are selected to be transmitted from the host to the viewers in connection with an update. Portions that are unchanged are not transmitted, as it may be assumed that the viewers are in possession of the non-changed information due to previous transmissions.

As described in greater detail below, to determine which portions of the host display information have changed, the software looks at hints generated by the host. The hints indicate that a portion of the host display information may have moved or may have changed since the last time the host display information was processed. As hints are received, the hints are associated with one or more tiles and stored in a hint queue. Upon receipt of an update request, the hints in the hint queue will be processed. To process hints, the host display information associated with the portion of the host display relevant to the hint is captured and compared with a previous version of the host display information. If there is a difference between the captured host display information and previous host display information, the changed portions of the host display information will be encoded using an encoding process selected for that portion of the host display information. The encoded information may then be transmitted to the viewers.

As described in greater detail below, changes that are detected in connection with processing host display information will cause update commands to be generated. The update commands may be paint commands, which contain information derived from the host display information and from which pixel data may be obtained, and copy commands, which are configured to indicate that a portion of the host display information has been moved from one place to another. One or more update commands may be included in an update message for transmission to the viewers. A collection of update messages that are generated in connection with processing the host display information upon receipt of an update request message will be referred to as an update. Thus, a given update may contain one or more update messages, and each update message may contain one or more commands.

Screen Capture

Figure 6:
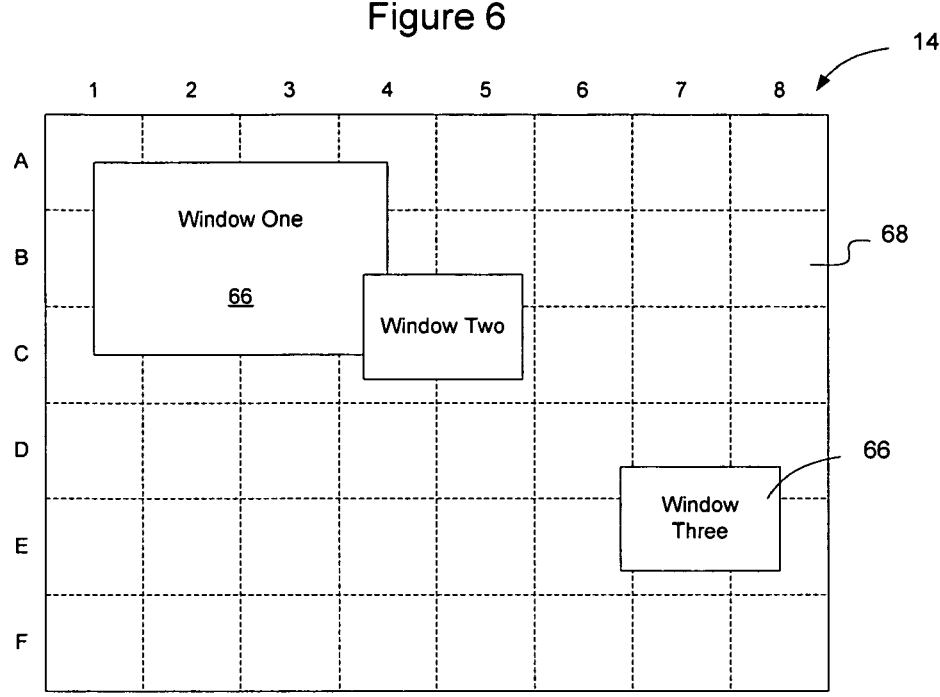
FIGS. 6-8 are functional block diagrams of a host display illustrating windows in the host display and alternative tile configurations according to an embodiment of the invention.
Figure 7:
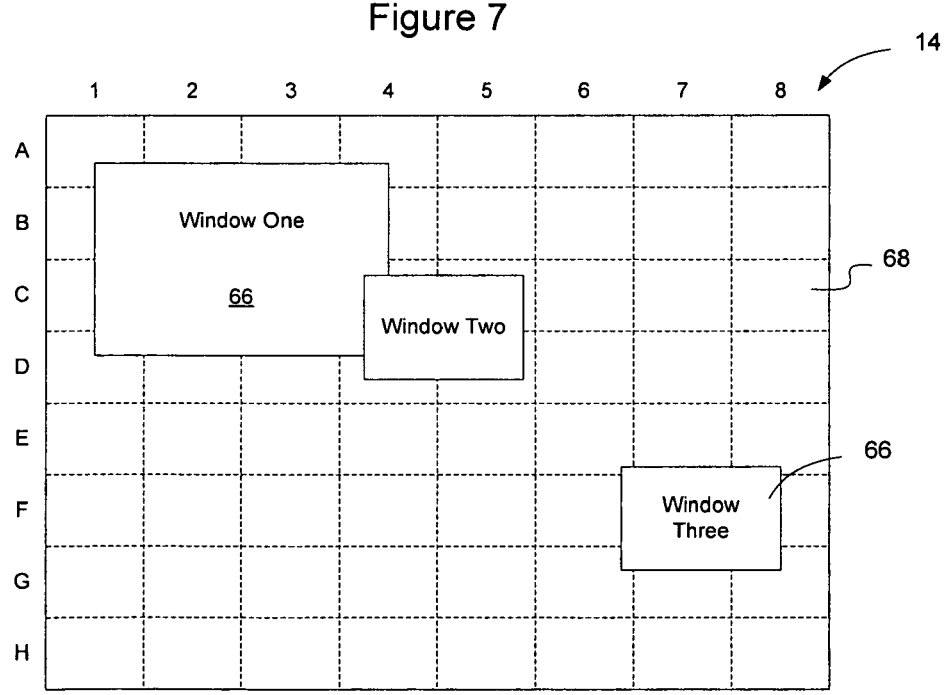
Figure 8:
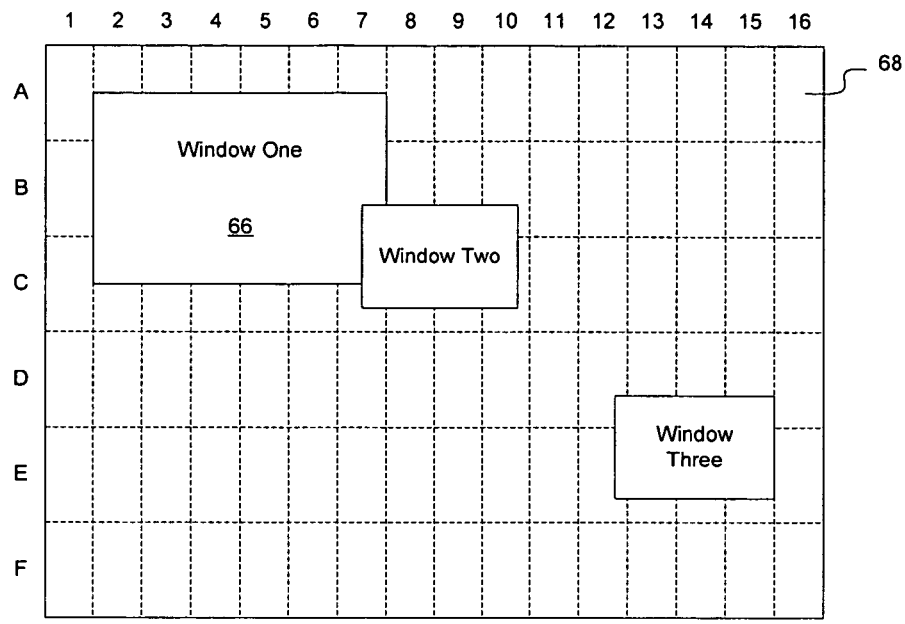

FIG. 6 illustrates an example of a host display 14 showing host display information. As shown in FIG. 6, the host display information may contain one or more open windows 66 displayed over a background image. For convenience, and to enable screen updates to be treated in an effective manner, the display may be broken up into a plurality of areas referred to herein as tiles 68. Each tile may represent, for example, a 16×16 or 32×32 pixel block of display area. The invention is not limited to an embodiment in which the host display is broken up exactly as described, however, as other ways of subdividing the screen into sections may be used as well. For example, the tiles may be square as shown in FIG. 6, or may be rectangular and oriented in a horizontal direction relative to the display as shown in FIG. 7, or may be rectangular and oriented in a vertical direction relative to the display as shown in FIG. 8. The invention is not limited to the particular dimensions, shapes, and orientations of the tiles.

In the example illustrated in FIG. 6, three windows are illustrated. The selection of windows is not intended to be limiting of the invention but rather is intended to provide an example that may help to illustrate an application of the invention and to provide a context for explanation of an embodiment of the invention.

Capturing and processing screen/display information is a relatively computationally intensive operation. To minimize the number of screen capture operations that must be performed, the RVS software will try to capture only those portions of the screen that are likely to have changed. Similarly, the RVS software may be configured to process those areas that are likely to have changed. For example, in FIG. 6, the windows 66 are more likely to contain changing portions of the display than the background area 68 of the display outside of the windows.

According to an embodiment of the invention, the RVS software may be configured to look at hint sources, such as other programs running on the host machine, that may cause the display to change and optionally to determine which parts of the host display information are likely to have changed. The portions that are likely to have changed may be determined in many different ways, such as by monitoring user activity, CPU activity, and other aspects of the programs that are actively providing content to be displayed as part of the host display information. For example, in a Windows™ environment (Windows™ is an operating system available from Microsoft Corporation of Redmond, Wash.), hints may be received from a display driver configured to talk to the display card to draw the display. Optionally, a replacement driver or additional driver may be provided to gather hints so that operation of the display driver configured to operate the host display need not be modified to provide hints to RVS software.

Hints may also be received from the Windows hook, which is a construct in Windows that is notified of user interface events. For example, the Windows hook will be notified when a user presses a key, clicks a mouse, or otherwise takes action via one of the user interfaces. Additionally, hints may be received from the front window polling process, which is a Windows process that checks the front window to see if it has moved or changed. Other hint sources may be used as well and the invention is not limited to an implementation that receives hints from all of these hint sources or only these particular hint sources. Additionally, the invention is not limited to use in a Windows™ environment, as the RVS software may operate on a Macintosh™ platform available from Macintosh corporation, a Linux or Unix platform, or on another computer platform configured to run one or more operating systems. Thus, the invention is not limited to an embodiment using the particular details set forth herein as the particular hint sources may depend on the particular combination of underlying hardware architecture and operating system selected to implement the selected computer platform.

Figure 9:
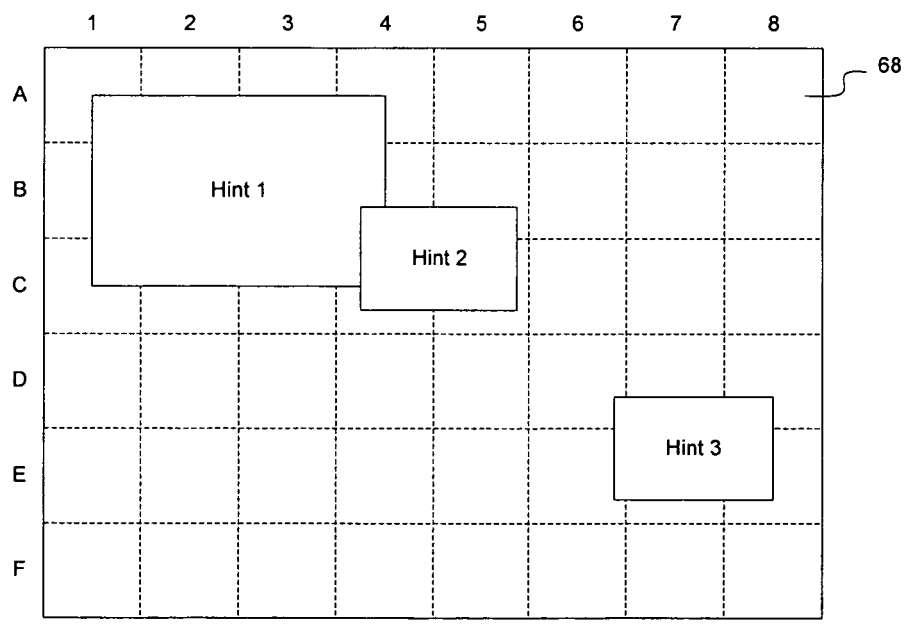
FIG. 9 is a logical view of a host display illustrating hints associated with the windows indicating that portions of the host display information may have changed in those areas.

FIG. 9 illustrates a logical view of the display of FIG. 6, in which hints have been received that relate to each of the three windows. A hint may apply to one of the windows or a sub-part of a window. In practice, where only one of the windows is active, hints may be more likely to be received for that window than for the other non-active windows.

Hints generated by hint sources are placed in a hint queue and retrieved to be processed in a desired order by the RVS software. FIGS. 10A-C, 11A-C, and 12A-C illustrate the generation of hints, logical views of the hint queue as the hints are received, and logical views of a consolidated hint queue in which the hints are organized prior to being processed. The consolidated hint queue may order hints for processing by the age of the hint, the location of the screen to which the hint applies, or in any other desired way. For example, hints in the active window may be placed in the consolidated hint queue to be processed first. Likewise, hints that indicate that a portion of the screen is moving may be prioritized to be processed first. Other ways of organizing the hints in the consolidated hint queue may be used as well and the invention is not limited to a particular way of organizing the hint queue.

Hints may be stored in order in the hint queue, as shown in FIGS. 10B, 11B, and 12B, and then organized into a consolidated hint queue upon receipt of an update request. Alternatively, the hints may be organized as they arrive into the consolidated hint queue. In either instance, the hints may be organized prior to processing to allow fewer hints to be processed and to allow hints from contiguous areas to be processed together to thereby accelerate processing of the hints in connection with generating an update. Other ways of handling the hints may be possible as well and the invention is not limited to the embodiment shown in FIGS. 10A-C through 12A-C.

As shown in FIG. 10A, initially it will be assumed that there are three hints, hint 1 affecting tiles A1, A2, B1, and B2; hint 2 affecting tile B4; and hint 3 affecting tiles D2 and D3. The hints will be stored in the hint queue shown in FIG. 10B in the order in which they are received. If an update request were to be received at this point, the hints may then be reorganized in the consolidated hint queue as shown in FIG. 10C. Since the consolidated hint queue orders the hints for processing in connection with generation of an update, the hints in the consolidated hint queue need not be stored in hint order as shown in FIG. 10C.

When another hint is received, as shown in FIG. 11A, the new hint (hint 4) will be added to the hint queue. The hint will be associated with tiles in the display and stored in the hint queue. In this instance, hint 4 affects tiles B4, B5, C4, and C5. If an update request were to be received after receipt of hint 4, since hint 2 affects only tile B4, and the new hint 4 also affects tile B4, hint 2 may be deleted from the consolidated hint queue when the hints are organized for processing.

FIG. 12A illustrates movement of a portion of the host display information from one place to another within on the display. When movement of the host display information occurs, the hints associated with the moved information may move as well. In the hint queue, however, the copy command would indicate that target areas A3-A5, B3-B5, and C3-05 may be affected due to the movement of source area containing hint 3 to the target area. Additionally, because the copy command may represent a movement of the source area, the tiles associated with the source area of the copy command are likely to have changed as well. Specifically, if the information contained in source area is moved, that area will need to be filled in with background or whatever other new information is now appearing on the host display in the source area. Thus, receipt of a copy command will cause the source tiles to be added to the hint queue.

If an update request were to be received at this point, the copy command would cause the hint 3 to move to the target area, to cause hint 3 to reference areas new areas B4 and B5. For example, in the example illustrated in FIG. 12A, when the source is moved to the target, the source covers the tiles B4 and B5 completely. Thus, any hints referencing tiles B4 and B5 may be removed from the queue. However, since the source area contained hint 3, which now affects tiles B4 and B5, the consolidated hint queue will continue to have reference to these tiles in connection with the copy command. Additionally, the target area only partially covers tiles C4 and C5 associated with hint 4. Since the hints do not contain precise positional information, the consolidated hint queue will continue to contain a reference to hint 4 (areas C4 and C5) even though processing such tiles may not be required. By consolidating hints in the consolidated hint queue, overlapping hints may be pruned from the hint queue to enable the size of the consolidated hint queue to be reduced to a smaller size for processing. As mentioned above, the hints may be processed directly from the hint queue or may be processed by consolidating the hints from the hint queue into a consolidated hint queue. The invention is not limited to an embodiment that uses a consolidated hint queue, therefore, as many ways of processing the hints may be implemented.

Hints tell the RVS software which areas of the screen should be processed, but don't actually generate any useful information for transmission to the viewers. To generate information for transmission to the viewers, portions of the host display information being shown on the host display in areas of the host display associated with the hints are captured and compared with a previous version of the host display information at the same area. The triggering mechanism for processing hints from the hint queue is receipt of an update request message by the host. Alternatively, hints from the hint queue may be processed at predetermined intervals, once the hint queue contains a threshold number of hints, or upon occurrence of another event or series of events.

Since capturing portions of the host display information for processing may be somewhat processor intensive, capture processes are preferably performed in such a way as to capture areas of the host display information only once, and in areas of relatively manageable size. When a hint source indicates that a portion of the host display information may have changed, an area of the host display information encompassing the portion to be evaluated will be captured.

Since it is desirable to avoid capturing a given area of the host display information more than once while processing hints from the hint queue, and hints from multiple sources may refer to the same area of the host display information, an array 70 of capture flags 72 (shown in FIG. 13) may be implemented to enable the RVS software to maintain a record of which areas of the host display information have been recently captured. This allows a given area of the host display information to be captured only once, while allowing hints to be processed in any desired order. As shown in FIG. 13, the areas of host display information that are captured may be larger than the tiles that are used to process the data, and optionally may include an integer number of tiles, although the invention is not limited by these particular details. For example, in the embodiment illustrated in FIG. 13, each capture flag represents four tiles since the RVS software in this embodiment is configured to capture areas of the screen that are equal in size to four tiles. The invention is not limited in this manner, as the capture areas may be of whatever size desired, and need not correspond to the tiles that are used to process the captured information.

In the example shown in FIG. 13, capture operations have been performed on tiles A1-A3, B1-B4, C1, and C3-C4. As hints are processed and additional areas of the host display information are required, additional portions of the host display information will be captured and the capture flags for those areas will be updated accordingly.

Multiple processes may be used to capture portions of the host display information. The host display information to be captured, according to one embodiment of the invention, is the actual pixel data e.g. RGB (Red, Green, Blue) or CMY (Cyan, Magenta, Yellow) values that are used to generate the images that are being shown on the host display. The capture process, in one embodiment, is independent of the underlying programs that are running on the host machine that are generating the host display information. For example, in a Windows™ based operating system, the Windows Graphics Display Interface (GDI) functions may be used to perform the capture operations. The invention is not limited to the particular manner in which capture operations are performed, however, as numerous algorithms may be used to capture the host display information. Additionally, the particular capture process selected to be used may depend on the type of computer or other device that is being used to control the host display, since the type of capture process may be optimized differently depending on the particular computer platform in use on the host machine or other physical characteristics of the host machine 16.

Once the capture process has retrieved host display information for a particular area, the retrieved host display information may be processed to determine if any changes have occurred in those areas vis-à-vis an earlier rendition of the same areas. Tile processing may be performed by comparing the current captured host display information for a tile with previous host display information for that tile. Where the comparison indicates that no change has occurred, the host display information for that tile is not required to be transferred to the viewer, since the viewer may be assumed to have the information for that tile already. Where the comparison indicates that one or more of the pixels in the processed tile has changed, the tile being processed will be encoded for transmission to the viewers using an encoding method selected for that tile. The encoded tile will form a paint command, which will be included in an update message to be transmitted to the viewers.

Once a tile has been processed in connection with a given hint, that tile will not need to be re-processed in connection with subsequent hints in the hint queue until a subsequent update request is received. Specifically, since the capture flags prevent a given area of the screen from being captured more than one time during a given update operation, it is not necessary to preprocess the same area of the screen multiple times where multiple hints refer to the same area. An array 74 of tile processing flags 76, such as the array shown in FIG. 14, may be used to keep track of which tiles have been processed to prevent tiles from being re-processed in connection with subsequent hints.

Although arrays have been used to illustrate one possible way of keeping track of the capture and tile processing operations, the invention is not limited in this manner as other data structures may be used to maintain this information as well.

Tile processing may occur in many ways. According to an embodiment of the invention, the host RVS software 20 maintains a viewer bitmap representation of what has been transmitted in connection with previous updates. When a portion of the screen has been captured, the captured information may be processed by comparing the captured pixel values with the stored pixel values of the viewer bitmap, to determine if the portion of the screen being processed has changed relative to the previous version that has been transmitted to the server/viewers. If there is no change, it is not necessary to transmit any new information to the viewers/server since it may be assumed that the portion of the screen being processed is already available at the server/viewers.

If a change is detected, the tile that contains the portion of the host display information that has changed may be encoded to form a "paint" command, which is a command that contains information associated with pixels to be displayed in that area of the screen. Alternatively, where the hint indicates that a portion of the screen has been moved, a copy command will be used to specify that the affected area of the host display information should be moved. Other commands may be supported as well and the invention is not limited to an embodiment in which both of these commands or only these commands are supported by the RVS tool. The type of hint retrieved from the hint queue will indicate whether a copy command or a paint command is more likely to be useful to convey the possible change to the host image. More information about the format of update commands, update messages, and updates, will be provided below in connection with Part III.

Encoding

As mentioned above, updates contain two types of commands, copy commands and paint commands. Paint commands contain image data which may be encoded (e.g. compressed) prior to transmission from the host to the viewer. Each tile that is to be encoded for transmission to the viewer may be encoded using an encoding method that is selected for that particular tile. According to an embodiment of the invention, an encoding method is selected for each tile or set of tiles from a plurality of available encoding methods, to enable the portion of the host display information in the tile to be encoded for transmission using an encoding method that is more likely to be able to effectively encode that portion of the host display information.

In one embodiment of the invention, the RVS tool may select between solid color encoding which is used to encode blocks of the screen that are formed of one solid color, a ZLIB encoding method based on the Lempel-Ziv algorithm, and one or more of the JPEG encoding methods. ZLIB may be preferable for encoding text, and JPEG may be preferable for encoding pictures, although the invention is not limited in this manner. The particular encoding method may be selected in a number of ways, such as by counting colors present in the portion of the screen to be encoded. The selected encoding method and information required to enable the viewer to decode the resultant paint command are indicated to the viewers to enable the viewers to decode the paint commands upon receipt.

The encoding method may be selected on a per tile basis, for groups of tiles, or in another manner. For example, a selection may be made by counting the number of colors present in each tile and, for that particular tile, determining which encoding method should be used based on the number of colors represented in the tile. In one embodiment: where a tile contains four or more colors, a JPEG encoding process may be used; where the tile contains two or three colors, a ZLIB encoding process may be used; and where the tile contains only one color, a solid color encoding process may be used. The solid color encoding process may simply encompass identifying the tile as having a particular solid color value. The invention is not limited to these particular numerical values, as other numbers of colors may be used to differentiate between the encoding processes to be used for the individual tiles. Additionally, although the process has been described as operating on individual tiles, the process may operate on groups of tiles as well.

Multiple data and image compression algorithms may be used. Due to the prevalence of the web browsers that are able to run Java programs and Flash programs, preferably an image compression algorithm compatible with these formats may be adopted, although the invention is not limited in this manner.

One of the possible encoding methods, ZLIB, is described in greater detail in IETF RFC 1950 and RFC 1951, the content of each of which is hereby incorporated herein by reference. ZLIB compression works well for images with few colors and/or large areas of single colors or regular patterns such as text. For example, while ZLIB can typically compress text and patterns to 4-6% of the original volume, it is not as efficient when compressing photographs or gradient tone images. ZLIB compression and decompression is typically relatively slow and relies on a combination of LZ77 and Huffman coding.

Another encoding technique that may be used is JPEG. JPEG is a relatively lossy compression algorithm that has been optimized for photographic type images. JPEG is relatively inefficient at compressing text and patterns or any image with many edges/sharp transitions. JPEG files typically contain a header section of Huffman and quantization tables and a data section. For efficient transmission the header tables can be sent once and reused with different image data, if the viewer is able to handle the separated tables and data.

The implementation of the encoding methods to be used may be negotiated between the participants and altered based on factors such as the speed or bandwidth associated with the viewers and host connections, the amount of processing required to perform the encoding, the amount of delay associated with the encoding process and which is able to be tolerated by the participants, and other speed and quality tradeoff considerations. For example, the particular JPEG quality factor to be used may be determined in this manner. Additionally, the screen size to be transmitted to the viewers and the quality of the image to be transmitted, i.e. the amount of color information for each bit to be transmitted, may be varied according to the type of encoding selected. Optionally, the encoding method selected by the participants may be re-negotiated during a session to enable different methods to be used as the session requirements change or as the condition of the network 22 changes.

Figure 15:
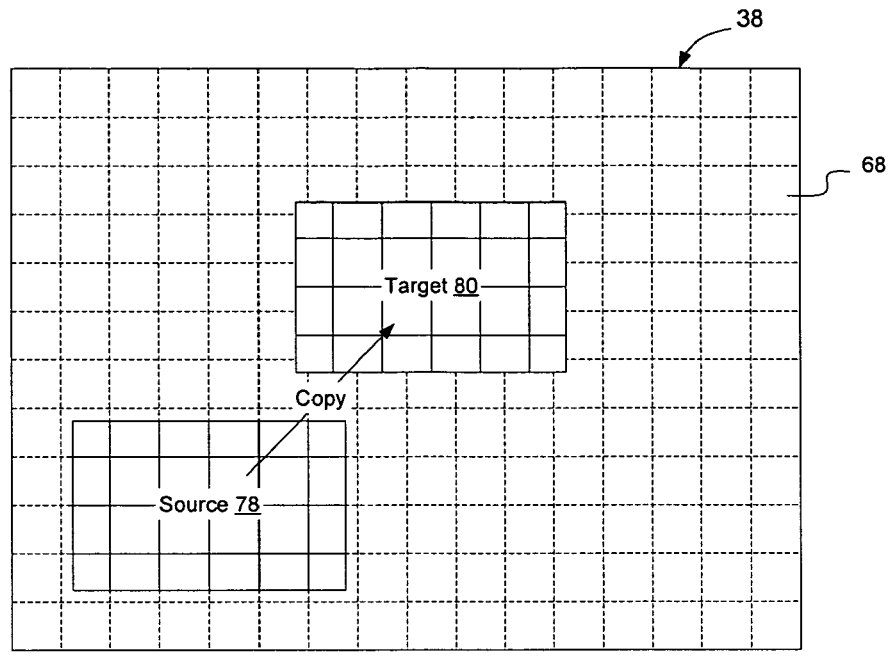
FIG. 15 is a functional block diagram illustrating a copy command according to an embodiment of the invention.

The process described above may be performed for all of the host display information or, alternatively, a portion of the host display may be designated to be transmitted using a different technology. For example, a portion of the host display information may contain a motion picture that may be more efficiently encoded using a motion picture encoding method such as MPEG (Motion Picture Experts Group). The invention is thus not limited to an embodiment that operates on the entirety of the host display information, as a subset of the host display information may be transmitted using another technology.

Where a portion of the screen is moved from one position to another position, (as shown in FIG. 15), instructions regarding the movement may be transmitted rather than re-transmitting the encoded data for both affected areas of the screen. For example, where a source area 78 of the host display information is to be moved to a target area 80, the movement may be accomplished by copying information in the source area 78 to the target area 80 and then filling in the source area 78 with new host display information using paint commands or by restoring previously transmitted host display information for that area from memory. Movement of a portion of the screen may occur where one window is translated on the screen, where content within a window is scrolled, or where a window is minimized or hidden and then restored or brought back to the foreground. Additionally, information may be scaled to cause the information to take up more or less area on the viewer's screen. Other instances of movement may occur as well and the invention is not limited to these several examples.

The size of the viewer's display may be smaller or larger than the size of the host display or, alternatively, the viewer may opt to allocate less than all available screen area in which the host display is to be recreated. In these instances and other situations, the host display information may be scaled before transmission to allow a different image size to be transmitted to the viewers. Alternatively, scaling of this nature may be performed at the service or at the viewer. Numerous ways of performing scaling may be utilized and the invention is not limited to a particular way of performing scaling or by whether or not scaling is supported.

Part III

Transmission

A transmission protocol configured to allow sessions to be established, terminated, and used by participants will now be described. The transmission protocol provides a message structure that may be used to exchange administrative information associated with the session, as well as host display information to be transmitted from the host to the viewers over the session. Other messages may be created using the transmission protocol as well, as described in greater detail below.

Messages

A machine that is to participate in a session will identify itself to the server as either a host machine or a viewer machine. Generally this identification will be performed in connection with initialization, however the roles of the participants may change during a session to enable one of the viewers to act as a host to show its screen in the session. Where this is to be implemented, a role indication message may be implemented. In the following description, particular messages are referred to as being used to communicate between the host and server, and other messages are used to communicate between the server and viewers. As the roles of the participants change, the messages used by the participants may change accordingly.

Many different messages may be used to establish and maintain connections between the host and server, and between the server and viewers. Additionally, messages may be passed directly between the host and viewers, when desired and when implemented to enable that to happen, for example where the host is implementing both host and server processes or otherwise hosting sessions with viewers directly.

As described in greater detail below, one of the types of messages (the update message) will be used to carry session data in the form of paint and copy commands. Other types of messages will be used to set up the session and exchange information associated with the session so that the participants may extract useful information from the session. For example, the messages may be used to exchange authentication information, authorization information, account information, and other information associated with the way in which the session should be set up. Other messages may be used to select a port for the session, establish encryption parameters for the session, allow the viewers to select a screen size to be used, establish timeout parameters, and to terminate the session. In addition, the messages may be used to perform administrative functions such as to inform the participants that an upgraded version of the software is available. Other aspects may be communicated using appropriate messages as well and the invention is not limited to a protocol using only the particular messages described herein or all of the particular messages described herein.

In the following description, multiple details associated with several types of messages will be provided, such as particular fields that may be used to convey particular pieces of information. The invention is not limited to an implementation that uses all of these particular details or these exact fields, as other implementations may use different field names, different field lengths, or determine that additional or alternative fields should be used to carry particular pieces of information. Thus, the invention is not limited to an embodiment that uses all of the implementation details provided herein.

Since update messages contain commands that are not reliant on other commands for execution, it is not critical that the viewers receive every update message as many of the update messages will become obsolete in a relatively short period of time. For example, a paint command may be quickly overwritten by a paint command in a subsequent update. Other messages, however, are of sufficient importance that they must be received by the viewers as they may affect the manner in which the viewer processes information associated with other messages. According to an embodiment of the invention, the messages contain two or more sequence fields to enable the viewer to keep track of which messages it has received and which it has not received, and which it needs to receive and which it does not need to receive. For example, the message may contain a two byte sequence number that will allow a viewer to determine if it has missed any messages, and may also contain a two byte "required" sequence number that may be used to allow a viewer to determine if it has missed any messages that are required to be received by the viewer. Examples of required messages may include copy commands, changes in screen size, and changes in encoding or encryption methods. Other commands may be deemed required as well. Although in this embodiment two different sequence numbers have been described, the invention is not limited in this manner as multiple sequence numbers of varying importance may be used to identify messages of differing priority levels in a session. For example, larger blocks of changed tiles may be deemed more important than smaller blocks of changed tiles. Additionally, tiles that fill in the source area when the source area has been moved may be deemed to be more important than other blocks of tiles. Thus, different types of paint and copy commands may be assigned different priority levels depending on the type of function to be performed by those commands in recreating the host image at the viewer.

Since the messages may be of different lengths, depending on the amount of information to be contained and the type of message, the message may also contain a length indicator that will enable the viewer to anticipate the end of the message. For example, a 3 byte length field may be used to allow framing when sent over TCP.

As mentioned above, several different types of messages may be used to set up and maintain the sessions, terminate a session, and transmit ongoing data over the session. To enable the messages to be distinguishable, the messages may contain a one byte message type indicator.

In the notation that follows, a number appended to each data element name indicates the number of bytes in that field. For example, the update message may assume the following format:

<msg>::=<seq2><rseq2><len3><mtype1> . . .

in which <msg> is a message in the protocol, <seq2> is a two byte sequence number, <rseq2> is a two byte required sequence number, <len3> is a three byte length value, and <mtype1> is a one byte value indicating the type of message. After the <mtype1> field, any required data may be included using the appropriate fields, as described in greater detail below. If encryption is specified, once keys have been exchanged, the message data starting after the <mtype1> value will be encrypted.

The following TABLE I summarizes several message types that may be used in connection with an embodiment of the invention. The invention is not limited to the use of these particular message types.

TABLE I

| Type | Description | Required Message | Sent By: | Content of data portion of message |
|---|---|---|---|---|
| C | Host/viewer Connect | Yes | Host Viewer | <major version1><minor version1> <clienttype1><ssnidlen1><sessionid> <clientinfo><auth info><key exchange info> |
| S | Server Connect | Yes | Server | <major version1><minorversion1><respcode2> <clientnum2><info><key exchange info> |
| E | Encoding | Yes | Host Server | <width2><height2><depth1><tilewidth1> <tileheight1><enc_map> Specifies encoding. Can be sent within session to change encodings (e.g. when viewers join/leave or display changes size) |
| A | Encoding Allowed | Yes | Server Viewer | <ack1><enc_map> Acknowledges encoding methods (ack = 1) or replies with encoding messages supported. Should result in another 'E' message if different from E messaging being responded to. |
| D | Encoding Parameter Data | Yes | Host Server | <n1><pad1>(<enc_id4><len2><data>) Specific data for an encoding method if required. If an encoding method needs more parameter data that can fit in a single message, it can split the parameter data into multiple D |

TABLE I-continued

| Type | Description | Required Message | Sent By: | Content of data portion of message |
|---|---|---|---|---|
| | | | | messages and add an indicator to the <data> for each section. This message is used primarily to transmit JPEG tables. |
| I | Cursor Image | No | Host Server Viewer | <imageid4><hotspotx2><hotspoty2><w2> <h2><depth1><enc1><len2><mask><enc1> <len2><image> |
| P | Cursor/ Pointer Position | No | Host Server Viewer | <cursorid4><imageid4><x2><y2><lastx2> <lasty2><linestyle1><lineweight1> <linecolor4> |
| U | Update (paint command) | No | Host Server | <bounds4><prevbounds4><nrects2> (<tilerect4><nscans1>(<startpos><enc + ntiles1> <etile>)) Update messages are described in greater detail below. |
| R | Request/ Resend | No | Server Viewer | <rect><lastrseq2><rtype1> |
| B | Block Transfer (Copy command) | Yes | Host Server | <nblts2>(<srcx2><srcy2><dstx2><dsty2><width2> <height2>) Instruction to copy a block of screen from one place to another. Values are in screen coordinates, source and destination values are signed, height and width are unsigned. High bit of <nblts> is set in the last message of an update. |
| T | Transmit | Yes | Host Server Viewer | Used to send Ack or Nack of Request to send |
| X | End/Close Connection | Yes | Host Server Viewer | <closereason2><closedata4><msglen2><msg> Either side can close the session. |

Several of the messages contained in TABLE I will now be described in greater detail. Other fields may be associated with the messages shown in TABLE I as well. For example, optionally an information field <info> may be used to convey information between the participants when such communication would help the participants understand the progression of the process.

Initial Connection

The initial connection between the host and server, or between the viewer and server, may be initiated using the host/viewer connect (C) message. The connect message specifies the version of the RVS software in use by the host or viewer. Additionally, the connect message specifies the role of the entity that issued the host/viewer connect message. For example, the connect message may specify that the participant issuing the message will be the host or that it will be a viewer of the session. Specifically, the connect message may contain a type <clienttype1> field that may take on two values—D for host and V for viewer. As a result of an initial connection attempt, a response will be generated indicating whether the connection was successful or failed. If the connection failed, the response may also indicate a reason, such as that the software in use was too old, one of the participants was unauthorized, that the viewer is attempting to connect to a session that doesn't exist, or that there is a problem with encryption. The message may also include an information field <info> (not shown in the above Table I) which may be used to convey additional information such as a text message to indicate why the connect request failed. The initial handshake also negotiates encryption if desired.

Pointer/Cursor Image

Treatment of the cursor may be handled independent of the updates, since the host's cursor on the screen may move around considerably more than other aspects of the host display information to be transmitted. Accordingly, the current location of the cursor may be transmitted via position changes and a default rendering of the cursor may be stored as part of the viewer's RVS software 26. The position changes may be merged with a bitmap of the cursor to enable the cursor to float over the viewer display information 38 being displayed at the viewer display 30. Optionally, multiple bit-maps may be stored by the viewer RVS software, such as an arrow used for pointing, an hour-glass used for indicating that the host machine is working, and other common cursors, and selection of the particular cursor may be communicated from the host to the viewer using the cursor image message (I). The position of the cursor may be conveyed using the pointer position message (P).

The cursor position may be sent as a sequence of discrete cursor locations which may be displayed by the viewer or interpolated by the viewer to cause the viewer to perceive smooth cursor motion. Alternatively, the cursor position may be tracked by the host and the position recorded over time to create a cursor path that may then be transmitted to the viewers.

Where the cursor position is sent as a sequence of discrete positions, the speed of the cursor may be inferred from the time intervals between cursor position updates. The time intervals may be explicit, such as through the use of a timestamp in the pointer position message and a comparison of timestamps by the viewers to determine how much time has elapsed between pointer position messages. In this embodiment, the timestamp may be an 8 bit value measuring milliseconds between generation of pointer position messages. Alternatively, the time difference between subsequent pointer position messages may be estimated by the viewer by determining how much time has elapsed at the viewer between receipt of pointer position messages. Other techniques may be used as well and the invention is not limited to the manner in which an amount of elapsed time is determined.

By determining the cursor position, inferring the cursor velocity from the positional difference and time difference, an approximation of the host cursor movement may be generated. Additionally, where the viewer is allowed to gesture by moving the cursor over the display of the session (as described in greater detail herein) the same techniques may be used to convey the cursor position to the host and other viewers on the session.

The viewer may also synthesize locally an approximation to the cursor's actual trajectory using a suitable curve fitting method, such as the use of splines, selecting a curve that passes through the transmitted coordinates, or using another technique to interpolate cursor positions intermediate known fixed points specified in the pointer position messages. In this context, it is preferred that the particular curve-fitting method selected be chosen such that the curve passes through (rather than just near) the cursor's transmitted coordinates so that the cursor can hit the correct location of an object in the event that the mouse is clicked during the presentation. In this embodiment, the viewer's cursor may be caused to move along the curve synthesized by the viewer software based on the data received via the pointer position messages.

When the host depresses one of the mouse buttons, the mouse may generate a clicking noise or cause the host computer to generate a clicking sound. The act of clicking may cause a pointer position message to be generated that may include a code to cause a clicking sound to be generated by the viewer's computer. Execution of the clicking sound by the viewers computer may be synchronized with the cursor display such that the clicking sound occurs at the when the viewer's cursor is positioned over the same position on the display as was the host's cursor when the host's mouse button was depressed.

The cursor may be overlayed over the other data forming the viewer display information using any available technology, such as by implanting a cursor with an image and a surrounding transparent area, and ANDing or XORing the cursor with the window data. Alternatively, the cursor image may be implemented using a single ARGB (Alpha Red Green Blue) bitmap. The cursor images may be sent from the server to the viewer with every update, or may be stored on the server so that they may be requested by viewers independently and downloaded from the server as necessary. The invention is not limited to the manner of implementing the cursor or the manner in which the cursor is merged with the viewer display information.

Updates

Update messages (U) are formed from commands, and are transmitted as messages in the transmission protocol described herein. A given update may include one or more update messages depending on the amount of information to be transmitted in the update.

One characteristic of a network, such as the network 22 on which the session will take place, is the Maximum Transmission Unit (MTU)—a value that indicates the largest datagram that may be transmitted over the network. As long as a message is smaller than or equal to the MTU, the message will not need to be divided into multiple datagrams to be transported over the network. To prevent interdependence between messages, a given update message U should be formed to have a length shorter than the MTU for the network on which the session is being carried. Currently, most Internet Protocol (IP) networks support a MTU value of at least 1300 bytes, although network implementations continue to change and the invention is not limited to a particular value for the MTU. Since a paint command is typically shorter than the network MTU, multiple paint commands may be included in a given update message.

By causing each update message to be transmittable within a given datagram, each message may be self-contained. This enables the messages to be independently used by the viewers and allows the transmission protocol to avoid interdependence between datagrams. For example, since each message is self-contained, each message may be processed independent of the other messages without requiring in-order transmission of datagrams, etc. Handling of missed messages will be described below in the transport section.

Figure 16:
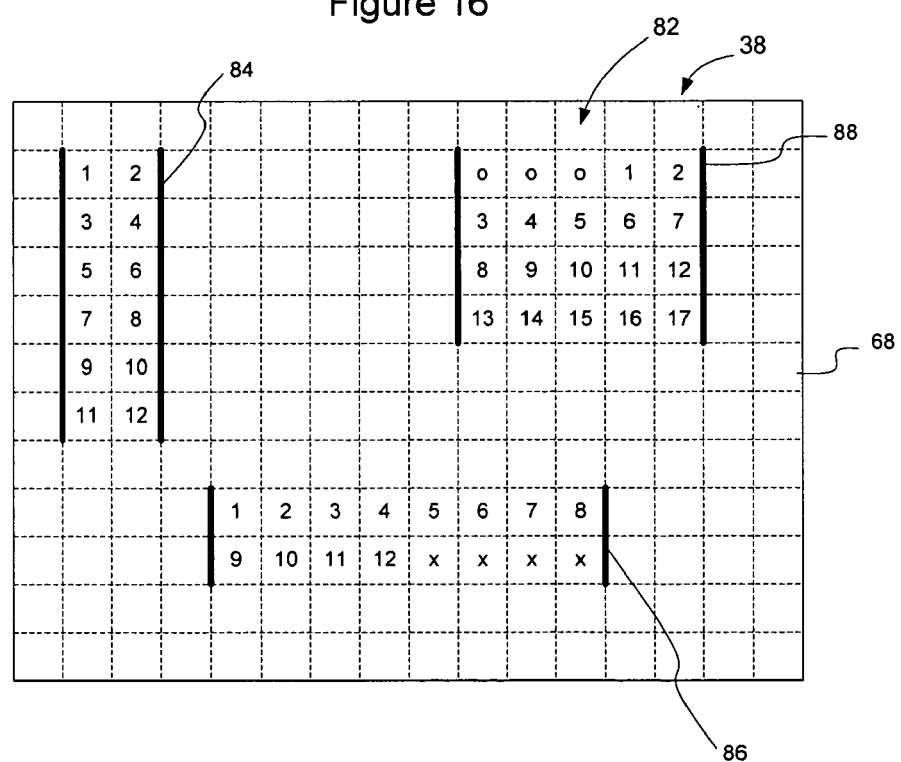
FIG. 16 is a functional block diagram of a host display illustrating bounding rectangles that may be used to convey positional information of paint commands according to an embodiment of the invention.

As discussed above, the host's display is divided into a grid of tiles 68, and tiles are processed and encoded for transmission in update messages. Each tile containing changed host display information will be encoded into a paint command, and a series of paint commands may be grouped together and transmitted in an update message. To enable the paint commands to be painted in the correct location on the viewer's display, the location of each paint command may be individually identified in the update message. However, to reduce the overhead associated with specifying location information for the paint commands, a bounding rectangle construct 82 may be introduced. FIG. 16 illustrates a few examples of bounding rectangles 82. In this embodiment, paint commands will be ordered within the bounding rectangle, for example from left to right within the bounding rectangle. Paint commands that would cause a tile to be painted that would extend beyond the right edge of the bounding rectangle will wrap to the next line of the bounding rectangle, so that the tile will be painted in a subsequent line within the bounding rectangle. In this way, by specifying the coordinates of the bounding rectangle and the starting position of the first tile, a series of tiles may be painted within the bounding rectangle without individually indicating the position of each tile.

An example of how bounding rectangles may be used to specify positional information on a display is illustrated in FIG. 16. As shown in FIG. 16, and as described in greater detail herein, the host display information 12 is divided into a plurality of tiles 68. Update messages contain bounding rectangle coordinates that specify an area of the display within which a series of paint commands are to be positioned. For example, in FIG. 16, a first bounding rectangle 84 is two tiles wide in a horizontal direction and six tiles long in a vertical direction. Paint commands associated with the update message will be painted within the bounding rectangle 84 starting at the left edge and continuing in a horizontal line until they hit the right edge of the bounding rectangle, and then wrap to the next line of tiles. Where the bounding rectangle is long in the vertical direction, such as bounding rectangle 84, the tiles will wrap more frequently. Where the bounding rectangle is relatively horizontal, such as bounding rectangle 86, the tiles may wrap less frequently.

The bounding rectangles may be made large enough to contain any desired number of tiles. It is not necessary that the update message contain sufficient tiles to completely fill the bounding rectangle, as the bounding rectangle serves primarily to designate the starting position of the tiles and the horizontal dimension associated with the set of tiles that is contained in the update. Thus, as shown by bounding rectangle 86, paint commands will be painted within the bounding rectangle but need not fill the bounding rectangle completely. Missing paint commands (that are not required to be painted) are indicated by the letter x in bounding rectangle 86 of FIG. 16.

Additionally, the first tile to be painted within the bounding rectangle need not be at the upper left corner of the bounding rectangle. Rather, a set of empty paint commands (indicated by an o in bounding rectangle 88), or an offset field indicating an offset number of tiles from the upper left edge of the bounding rectangle, may be used to specify that the first tile should be painted a given number of tiles away from the upper corner of the bounding rectangle. This may be used where a given set of paint commands are to start at an interior position of a bounding rectangle. An offset position may be implemented using an offset field that is transmitted as part of the bounding rectangle definition. The invention is not limited in this regard, however, as alternatively two or more bounding rectangle commands may be used to convey the update—one for the first partial row of tiles and one for the remaining rows of tiles.

The invention is not limited to the use of a particular order of painting of tiles within a bounding rectangle. Thus, although the described embodiment assumes that the tiles will be painted from left to right and then wrap back to the left edge, other ordering schemes may be used as well such as painting from top to bottom, right to left, diagonally, or back-and-forth in an S-like pattern. Thus, the invention is not limited to the particular order in which tiles are painted within the bounding rectangle.

The bounding rectangle may be defined by the top left corner and bottom right corner coordinates, or by other coordinates specifying the dimensions of the bounding rectangle such as the start position and a width. Optionally, the bounding rectangle parameter may be set to full screen if desired.

An update message may contain a number of additional fields to allow additional information to be conveyed. For example, in addition to the current bounding rectangle, the update message may also contain a bounding rectangle of the a previous update. The update request message may also include a field containing a count of the number of paint commands in that message, a field referred to herein as <lastrseq2> indicative of the last required sequence value received, and a field configured to indicate the update request type (where more than one update message type is supported). Other fields may be included as well and the invention is not limited to an implementation that uses all of these or only these several identified fields. For example, an update message may take the following form:

<update>::=<bounds4><prevbounds4><nrects2> <updaterect>* in which:
<nrects2>::=2 byte field, the low 15 bits of which are a count of encoded rectangles (may be 0). The high bit of this field is set if this is the last update message in an update.
<updaterect>::=<tilerect4><nscans1><updatescan>*<
updatescan>::=<startpos2><enc+ntiles1><etile>*<
startpos2>::=<tilepos2> position of first tile in scan
<tilepos2>::=<tilex><tiley> 8 bits each, screen x,y divided by tile Width/Height. Other values may be used as well. Using these values, the maximum screen size of 256*16=4096×4096 may be achieved. Where differently sized tiles are used, e.g. 32×32 bit tiles, other values may be used as well. The tile size and, hence tile positions, may be changed during a session.
<tilerect4>::=<tileleft1><tiletop1><tileright1><tilebottom1>8 bits each.
<bounds4>::=<tilerect4>
<prevbounds4>::=<tilerect4>

The <bounds4> field defines the bounding rectangle within which paint commands will cause tiles to be painted. The bottom/right values are the tile positions of the bottommost and rightmost changed tiles of the bounding rectangle. They have values that are one less than the actual tile coordinates of the true bounding rectangle. For example, a <bounds4> value of 2, 3, 2, 3 would be sent if the single tile at 2, 3 were changed; and 0, 0, 0, 0 would be sent if the tile at the top left corner of the screen was to be updated. Other conventions may be adopted as well, such as for example, where the values of the <bounds4> field are one lower than the actual position. Where the system is configured to allow information to be written to a virtual location, such as a local cache location, the values of the <bounds4> field may also be configured to extend beyond the visible locations on the screen.

The <enc+ntiles1> field is a 1 byte value, of which 3 bits indicate the encoding type and are used to index into the encoding tables <enc_map>, and 5 bits indicate the number of encoded tiles <etiles> contained in the message (between 1 and 32) that have been encoded using that encoding type. As mentioned above, the paint commands will contain tile data that may be encoded using a number of different encoding methods. For example, the tile data may be encoded using a solid color encoding method specifying the color (e.g. RGB value) of the tile, a ZLIB encoding method using the <len2><zlib data> fields, or a JPEG encoding method using the <len2><jpeg data> fields. Where RGB is to be used, the <rgbcolor> field encodes one pixel and contains 3 bytes—one for each of the R, G, and B values. Alternative, BGR format may be used where the viewers are implementing a Windows based operating system, since Windows native format is BGR. Other ways of specifying the encoding method used for a particular tile or set of tiles may be used as well.

Optionally, other additional fields may also be used. For example, a repeat field may be used to specify multiple repeat tiles where, for example, several tiles to be transmitted are identical. For example, the field <bnrepeat> may be used to specify a one byte repeat count indicative of the number of identical tiles that should be drawn on the screen.

Updates may be transmitted automatically by the server or, alternatively, may be sent to the viewers only upon request by the viewers. For example, viewers may request updates using the R message described above. Allowing the viewers to request updates enables the viewers to indicate to the server when they have completed reception of the previous update and, hence, are ready to start receiving additional update messages from the next update. The rate at which a particular viewer may be able to receive updates is a function of the viewer processor speed and availability, and network conditions between the server and the viewer. Since these factors may vary from viewer to viewer, different viewers may be able to process updates at different rates. Thus, in this embodiment, the server will queue update commands in an update queue and send the updates to the viewers as the viewers request them. Additional information regarding the transmission of updates to viewers at different rates is provided below in Part IV.

Encoding

As discussed above, data in a paint command may be encoded using one of a plurality of different encoding methods. Negotiation of the encoding methods may be performed during the session or, alternatively, as part of the initial session set-up. The particular type of encoding process that was used to generate paint commands associated with a specific update may then be communicated using an encoding message (E) indicative of the encoding type and/or encoding version. Encoding negotiation may occur between the host and the server, and then between the server and the viewers, or may occur directly between the host and the viewers.

Encoding types are negotiated with the E and A messages. The encoding message may take the following form:

<enc_map>=<ne1><enc_id4>* in which the <ne1> field is a one byte value (values 1 to 8) which indicates the number of encoding ids to follow. The <enc_id4> field is a 4 byte encoding type value, indicating the type of encoding that has been used. For example, the encoding type may indicate that the data is raw data, solid data, ZLIB encoded data, or JPEG encoded data. The D message (discussed above) is used to transfer the JPEG tables that will be needed to decode the JPEG encoded tiles. Other messages may be used as well, such as to transfer ZLIB dictionary information.

Framing

An update is formed as a series of update messages. To enable messages from subsequent updates to be distinguishable, an update delineation message may be used to mark the end of an update. Alternatively, as discussed above, the high bit of the <nrects> field may be used as an end of update marker or another marker may be used. The update delineation message may be a required message or may be implemented to require acknowledgment of receipt by the viewers.

Transport

The underlying transport technology used to carry the traffic may automatically perform congestion control, recover/retransmission of missed updates, and other aspects associated with reliable transmission of update messages. However, different types of transport technologies implement subsets of these functions. For example, Transmission Control Protocol (TCP) may be used to allow reliable transport of messages between the host and server, or between the server and viewers. Another protocol, commonly referred to as Datagram Congestion Control Protocol (DCCP) allows congestion control to be implemented without implementing the reliable transmission aspects of TCP. User Datagram Protocol (UDP) may also be used, although UDP does not implement either the congestion control aspects of DCCP or the reliable transmission aspects of TCP. Accordingly, the particular type of transport technology used to carry a session may require one or more of these functions to be performed by the protocol rather than the network.

Since display changes often occur in rapid succession within a localized region, it is often not necessary for a viewer to reliably receive all update messages. Specifically, a missed update message may contain data that will be overwritten in relatively short order, so missing a given update message may only cause a temporary error to appear in the viewer display information. Additionally, since each update message is self-contained and often doesn't require the viewers to receive any other messages to recreate a particular portion of the screen, the order of updates is less important than if the updates were interdependent.

Although reliable transmission of some of the update messages is not required, reliable transmission of other messages may be required as discussed above in connection with the required sequence number. Hence, it may be desirable to enable the viewers to request updates that are lost in transmission or otherwise don't get transmitted to the viewers. To enable the protocol to correct for transmission errors, the update messages may contain a sequence number and the bounding rectangles of the last few updates. Missed updates may then be re-requested by bounding rectangle at the discretion and convenience of the viewer. Optionally, a viewer may recover from a large number of missed update messages by requesting a full update. Requesting a full update may also be performed at the direction of the user, such as by depressing a control button associated with the viewer software. The invention is not limited to the manner in which transport reliability is achieved as many different transport mechanisms may be utilized depending on the underlying transport protocol and the robustness required of the RVS software.

Viewer Gesturing, Remote Control and Switching Hosts

Although the RVS tool is primarily designed to send display information from a host to viewers, other information may be communicated via the session as well. For example, a viewer may be allowed to point at information on the host's display, mark and draw gestures "on top of" the display, control the host's machine remotely (using the guest's mouse and keyboard) or become the session's host (so participants view the guest's screen). Other viewer participation may occur as well and the invention is not limited to a system that only supports these several types of viewer interaction.

For example, when a viewer moves her mouse over her view of the display, her cursor may be caused to change appearance. If the viewer then depresses a mouse button (right or left), a colored mark may appear on the viewer's view of the display. If the user simultaneously moves the mouse while depressing the button, the mark traces a gesture. When the viewer releases the mouse button, the gesture ends. Whenever the viewer's mouse button is depressed, the coordinates of the location of the viewer's mouse relative to her view of the host's display are transmitted to the server, which relays the information to the host and other viewers.

The host and all participants' computers use the coordinates and interpolation procedures discussed above to synthesize the same mark or gesture. By applying mouse trajectory interpolation techniques described earlier, the gesture's shape and "energy" (velocity & acceleration) may be reproduced with sufficient accuracy to convey the way the viewer made the gesture. Upon release of the mouse button or within a few seconds after the viewer releases the mouse button, the gesture fades away, avoiding the need to provide (and train participants how to use) a method to "erase" annotations. Alternatively, the mouse gesture may be caused to disappear after an initial gesture triggering mechanism (such as toggling a locally displayed button) has been deactivated. Where the session is being recorded for archival purposes, the gesturing may be optionally included with the recorded session or may be omitted from the recorded session to allow a subsequent viewing of the session to not include the gesturing by the viewers. As another example, a viewer participant might signal to the host (by clicking a button or selecting a menu pick) that the viewer would like to request to remotely control the host's computer. If granted, the viewer's mouse and keyboard may then control the host's computer whenever the viewer window is active.

As yet another example, a viewer participant who has RVS software 20' installed on their machine may co-host a session, causing the viewer display information to be viewed instead of or in addition to the host display information. Thus, although the primary flow of information in the described example is from the host to the viewers, the RVS system also may be configured to support other flows of information as well and may allow participants to change roles during a particular session.

Part IV

Participant Bandwidth Accommodation

Viewers may have different capabilities which may affect the frequency with which they are able to receive update messages. For example, one viewer may have a slower network connection (either innate or due to congestion on the network) and not be able to receive updates as fast as another viewer.

According to an embodiment of the invention, update commands may be maintained in an update queue at the server and distributed to viewers according to the viewers' abilities to receive them. As update commands arrive that supersede older update commands, the new update commands may cause the old update commands to be removed from the queue so that the older update commands may be pruned from the update queue. Where the pruned update messages have not yet been sent to the slower viewers, the pruning process enables soon to be obsolete information to be selectively not transmitted to slower viewers. In this manner, different numbers of update commands may be provided to different viewers depending on their abilities, without requiring transcoding of the update commands, multiple tier encoding, or the use of multiple transmission streams by the host. In effect, pruning of the update commands from the update queue allows the updates in the update queue to be reduced in size or eliminated over time, to make them easier to transmit to slower viewers. The limited bandwidth available to particular viewers thus may be optimized by removing out-of-date update commands from the update queue as they are rendered obsolete by the addition of newer update commands to the update queue.

Several ways of pruning update commands from the update queue will be disclosed herein. The invention is not limited to these particular methods of pruning as multiple methods of pruning update commands from the update queue may be used. Additionally, while the use of an update queue will be described, the invention is not limited to this embodiment as other data structures may be used to hold update commands pending transmission to the viewers. Likewise, although the invention will be described in connection with an embodiment in which update commands are individually pruned from the update queue, the invention is not limited in this manner as groups of update commands, such as update messages, or other logical associations of update commands may be pruned collectively from the update queue in other embodiments. Thus, the invention is not limited to the specifically described embodiment.

Figure 17:
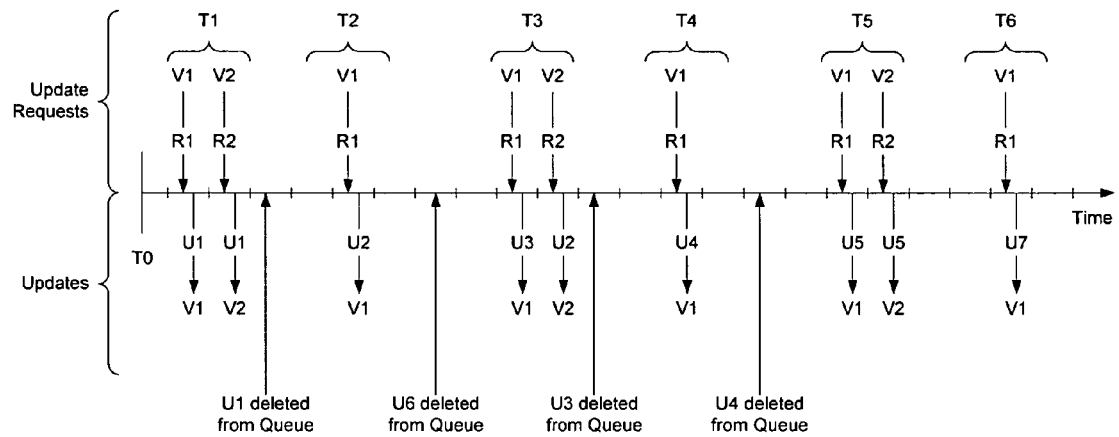
FIG. 17 is a time line of an example of a series of request and update commands that may be exchanged between a remote viewing service and participants according to an embodiment of the invention.

FIG. 17 illustrates an example of a timeline showing how update request messages R1 and R2 generated by two viewers V1 and V2 and updates (U1-U7) may be sent to the viewers over a session. FIGS. 18A-F illustrate the update queue at six different times along the time line shown in FIG. 17. The invention is not limited to the particular example sequence illustrated in FIGS. 17 and 18A-F, as this example is merely intended to highlight several possible scenarios that may be encountered when transmitting updates to viewers. To simplify the explanation of how this example operates, it will be initially assumed that each update includes only one update command, and that the server will transmit the update command in an update message to the viewer upon receipt of an update request. In practice, a given update may include multiple commands that may need to be grouped into several update messages to be transmitted to the viewers. As described in greater detail below, individual commands may be pruned from the queue to cause the updates to be reduced in size, and the invention is not limited to an embodiment in which pruning takes place on updates as a whole.

Figure 18A:
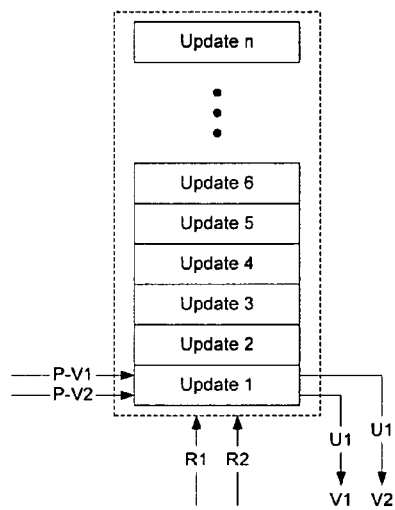
FIGS. 18A-18F are functional block diagrams of an update queue at six times along the timeline shown in FIG. 17.

As shown in FIG. 17, the example timeline starts at time T0, at which point it will be assumed that there are update commands in the update queue to be transmitted to viewers V1 and V2. At time T1, both viewers V1 and V2 issue requests R1 and R2 to receive updates. As shown in FIG. 18A, at the time the update requests are received, pointers P-V1 and P-V2 are both pointing to update U1. Accordingly, in response to the receipt of requests R1 and R2, the remote viewing service 32 will transmit update U1 to both viewers. Specifically, the remote viewing service 32 will transmit an update message containing the update command associated with update U1 to viewer V1 and will similarly transmit update U1 to viewer V2.

Once the server has transmitted an update to a viewer, it will advance the pointer for that viewer to point to the next message in the update queue. Alternatively, the pointer may remain at the current location and be moved forward to the next update upon receipt of a subsequent update request. The invention is not limited to the manner in which the pointers are incremented in connection with execution of an update request process.

As mentioned above, to allow different viewers to receive updates at different rates, obsolete update commands are pruned from the update queue. Where the update is formed form a single update command, pruning of the command will cause the update to be removed from the update queue. Where the update has more than one command, pruning of update commands from the update queue will cause the number of update commands associated with a given update to be reduced, so that fewer update messages will be required to transmit a given update to a slower viewer than were required to transmit the update to a faster viewer.

The commands are pruned whenever new commands, associated with new update messages, cause the older update commands to become obsolete and the older update commands are otherwise not required to be saved in the queue. Several ways of determining which updates may be pruned from the update queue will be provided in greater detail below. For purposes of the present description, however, it will merely be assumed that an appropriate process was used to delete update 1 from the update queue.

Additionally, to maintain the queue at a reasonable size, updates or update commands may be pruned from the update queue once they have been transmitted to all participants or at a particular time subsequent to their transmission to all participants. As an illustration of this, as shown in FIG. 17, between times T1 and T2, update U1 may be removed from the queue, since it has been transmitted to all viewers. Optionally, removal from the queue may be delayed until all the viewer pointers are sufficiently advanced relative to the update's position in the queue such that the update is not likely to be re-requested by any viewer. Additionally, removal from the queue may be delayed until the command is replaced where, for example, a complete set of commands is maintained in the queue so that new viewers, joining an ongoing session, may be provided with a set of updates that will allow the new user to recreate a complete representation of the host's screen.

Figure 18B:
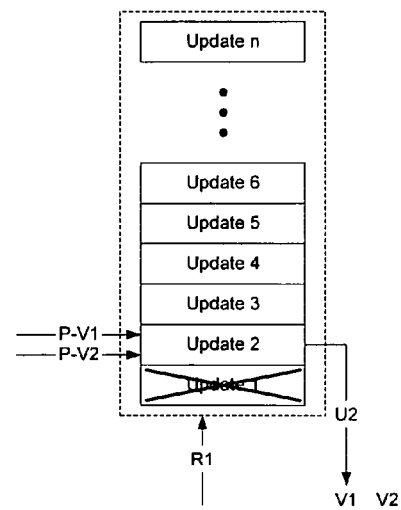

In the example illustrated in FIG. 17, viewer V1 is able to receive and process updates twice as fast as viewer V2. Accordingly, at time T2, viewer V1 issues a request R1 for another update. Viewer V2, however, has not issued a request R2 and thus will not be provided with an update at time T2. Upon receipt of the request message R1 by the server at time T2, the server will read the pointer associated with viewer V1 (P-V1) and transmit the next update to the requesting viewer. As shown in FIG. 18B, in this case, viewer V1's pointer (P-V1) is pointing to update U2 at time T2, so the server will transmit update U2 to the viewer V1. Pointer P-V1 is then incremented to point to update U3.

Between time T2 and T3, a prune instruction is executed to remove update message U6 from the queue. This may occur because of receipt of a subsequent update that renders the commands contained in update message U6 obsolete.

Figure 18C:
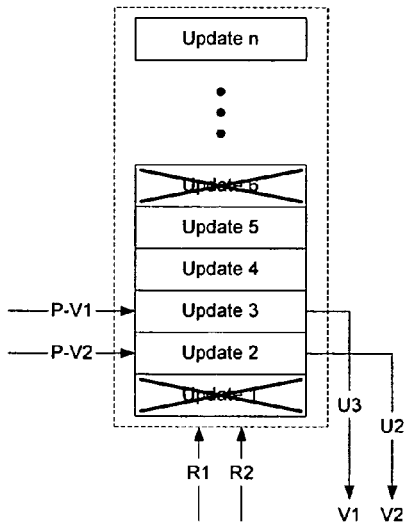

At time T3, both viewers V1 and V2 transmit requests for updates (R1, R2) to the server. As shown in FIG. 18C, the pointer associated with viewer V1 (P-V1) is pointing at update U3 and the pointer (P-V2) associated with viewer V2 is pointing at update U2. Accordingly, at time T3 the server will transmit update U3 to viewer V1 and will transmit update U2 to viewer V2. Upon transmission of the updates, the pointers for viewers V1 and V2 are incremented so that pointer P-V1 points at update U4 and pointer P-V2 points at update U3.

Figure 18D:
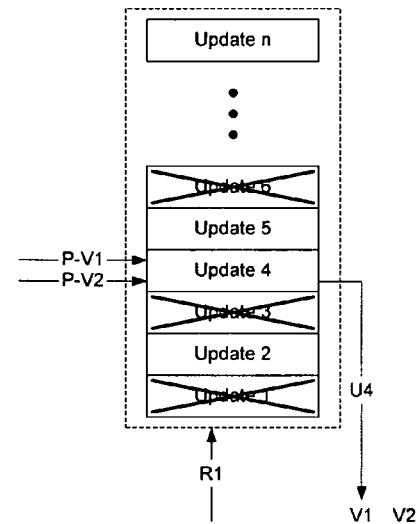

In between times T3 and T4 a prune instruction is executed to remove update U3 from the queue. Since the prune instruction in this instance is directed to an update that is referenced by a pointer (pointer P-V2), the pointer referencing the pruned update will be incremented to reference the next subsequent update. Accordingly as shown in FIG. 18D the pointer for viewer V2 (P-V2) is incremented to point to the next update U4 in the queue. By incrementing the pointer to the next subsequent update in the queue and allowing updates to be deleted from the queue, more updates may be transmitted to faster viewers such as viewer V1 while allowing fewer updates to be transmitted to the slower viewers such as viewer V2. Additionally, where the update includes more than one command, pruning the commands from the queue will reduce the number of commands associated with a given update to thereby reduce the size of that update. This, in turn, will make it easier to transmit the update to the slower viewers. Pruning may take place on individual commands in the update queue to allow the size of the updates to be reduced over time. Alternatively, pruning may take place on groups of commands such where the original update message structure is maintained in the update queue, or where pruning is implemented to be performed on other logical associations of update commands.

As shown in FIG. 17, at time T4, viewer V1 issues a request R1 and viewer V2 does not issue a request given the different rates at which these viewers are able to process updates. Accordingly, the remote viewing service 32 determines the location of the pointer P-V1 in the update queue, which in this example is pointing at update 4, and transmits update U4 to the viewer V1. The pointer P-V1 associated with viewer V1 is then incremented to point to update U5.

In between time T4 and T5 update U4 is pruned from the queue. At time T5, as shown in FIG. 17, both viewers V1 and V2 issue update requests R1 and R2. To service the update requests, the server finds the pointers associated with the requesting viewers (shown in FIG. 18E) and copies commands form the update queue that are associated with the update reference by the pointers. In this example, the pointer P-V1 associated with viewer V1 is pointing to update U5. Accordingly, the commands from update U5 that have not been pruned from the update queue will be transmitted to viewer V1.

Figure 18E:
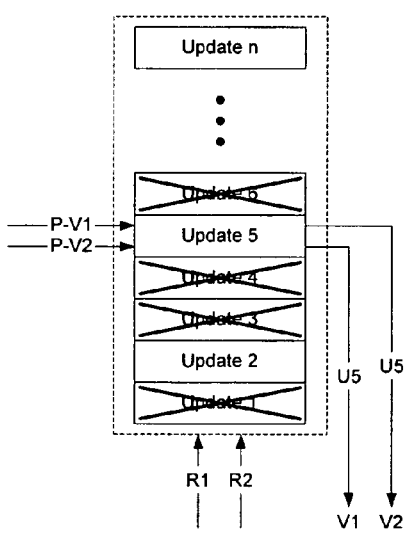

The last update transmitted to Viewer V2 was update U2 in FIG. 18C. Thus, upon transmission of that update, viewer V2's pointer P-V2 was incremented to point to update U3. Prior to receipt of the request R2 from viewer V2, updates U3 and U4 were deleted from the queue. As mentioned above, deletion of an entry in the queue may cause all pointers associated with that entry to be incremented or, alternatively, the pointers may be incremented upon receipt of a request associated with the pointer. Thus, for example, pointer P-V2 can be incremented to reference update U4 when update U3 is deleted (as shown in FIG. 18D), and may again be incremented to reference update U5 when update U4 is deleted (as shown in FIG. 18E). Alternatively, pointer P-V2 may continue to point to deleted entry update U3 until receipt of a request associated with that viewer (R2) at which time the pointer may be incremented to the next remaining update which, in this example, is update U5. In either instance, the end result is the same—at time T5 the pointer associated with viewer V2 (P-V2) will be incremented or have been incremented to reference update U5, and the server will collect commands remaining in the update queue associated with update U5, form update messages using those commands, and transmit the update messages to viewer V2.

Figure 18F:
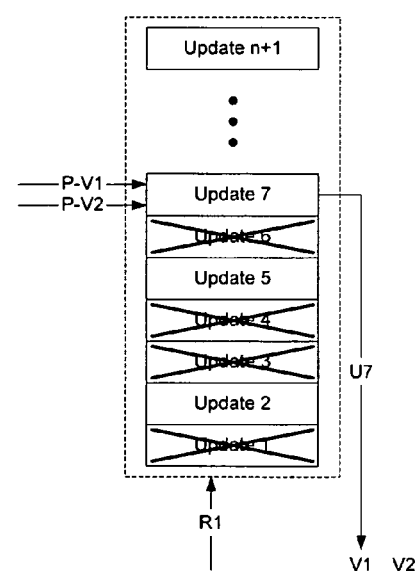

Once the updates have been transmitted, the appropriate pointers will be incremented using the updating process. In this example, both pointers P-V1 and P-V2 will be updated. However, since update U6 was deleted from the queue between times T2 and T3 (see FIG. 17) the pointers for viewers V1 and V2 will be incremented to point to update U7 as shown in FIG. 18F. Updates thus may be deleted from the queue in any order and accommodated by causing the pointers to skip those portions of the queue that are no longer relevant. Additionally, as mentioned above, commands may be deleted from the update queue individually to cause the size of the updates to shrink over time.

As updates arrive from the host, the commands are extracted from the update messages and are added to the queue for transmission to the viewers. As discussed above, commands are self-contained sets of instructions that are not reliant on other commands to be decoded. Forming the commands to be self-contained allows individual commands to be extracted from the update queue without regard to the other commands in the queue.

The update queue in this instance may be implemented using any convenient memory structure, such as a FIFO register containing pointers to memory locations in shared memory containing the commands. As updates are received, the commands from the update may be stored in the shared memory and pointers referencing the command may be added to the queue. As updates and individual commands are pruned from the queue, the pointers may be deleted from the FIFO and the memory associated with the pointers released back into the free memory pool. Alternatively, the update queue may be implemented as two parallel memory structures, one containing a FIFO containing pointers to the commands and another containing a parallel deletion reference indicating which commands in the update queue should not be processed. Many different memory structures may be used to implement the update queue and the invention is not limited to the particular technique chosen to implement the update queue.

As shown in FIGS. 19A-C, 20A-C, and 21A-C, conceptually, as updates are received, the new updates may contain commands which replace old commands associated with previous updates. For example, where the original display is broken into a series of tiles, and update messages contain paint commands referencing particular tiles, earlier paint commands may be deleted from the queue when a paint command for the same tile is received as part of a subsequent update. FIGS. 19-21 illustrate an example of this process. The process becomes more complicated as copy commands are introduced. For the purposes of this example, it will be assumed that the position of the tiles on the display may be determined independent of the other tiles (e.g. each tile is individually addressed or the address may be extracted from the bounding rectangle construct described above), and that copy commands are not supported so that there is no cross-referencing of tiles between grid areas. Handling of copy commands will be addressed in greater detail below.

In the example illustrated in FIGS. 19-21, it will initially be assumed that the update queue is empty. As shown in FIG. 19A, when a first update U1 is received, the paint commands contained in the update will be added to the update queue. In the example illustrated in FIG. 19, update U1 contains six paint commands (referred to in this example as commands 1-F, 1-G, 1-H, 1-K, 1-L, and 1-M) each of which contains pixel data to paint a particular portion of the display. The reference numbers in this example indicate the number of the update in which the paint command was received (which is the first number) and the position of the tile on the display that is affected by the paint command (the letter). Thus, for example, reference number (1-F) indicates that the paint command was received as part of update number 1 and that it is associated with tile F. The reference numbers in this example have been selected merely to help illustrate conceptually what is happening. In practice, the RVS software would likely keep track of the updates using other nomenclature.

As shown in FIG. 19B, upon receipt of update U1 the queue may be visualized as containing paint commands for the six tiles that were received as part of update U1. FIG. 19C illustrates the update queue as it would appear if implemented using a FIFO. As shown in FIG. 19C, the update queue contains a listing of the paint commands to enable those commands to be output to viewers as requested.

When a second update U2 is received, as shown in FIG. 20A, the paint commands contained in the second update will be added to the update queue. In this example, the second update contains paint commands 2-C, 2-D, 2-E, 2-H, 2-I, and 2-J, which will be added to the update queue.

According to an embodiment of the invention, paint commands that are rendered obsolete due to the subsequent receipt of another paint command for the same area will be removed from the queue. In this example, since the second update contains a paint command (2-H) that overlaps with the previous paint command (1-H) for tile H, the earlier paint command (1-H) will be deleted from the queue and the later paint command (2-H) will be added to the queue. This may be visualized as shown in FIG. 20B. Where the queue is implemented as a FIFO data structure, as shown in FIG. 20C, the paint commands from the second update message are added to the queue, and paint command 1-H is pruned from the queue since it is no longer the most recent command for that particular tile.

FIG. 21 continues to illustrate how the system may handle receipt of subsequent updates as the queue becomes more and more filled. As shown in FIG. 21, when an update U3 containing paint commands 3-G, 3-H, 3-I, 3-L, 3-M, and 3-N is received (FIG. 21A), the paint commands from the newly received update message will be added to the update queue and any paint commands that are in the update queue that are overwritten by the paint commands from the newly received update will be removed from the update queue. In this instance, update U3 contains paint commands referencing tiles G, H, I, L, M, and N, which will cause paint commands 1-G, 1-L, 1-M, 2-H, and 2-I to be removed from the queue, as shown in the visualization of the queue (FIG. 21B) and as shown in the FIFO queue structure (FIG. 21C). It should be noted that because new entries for a given tile cause old entries for that tile to be deleted, in this embodiment, the update queue may be limited in length to contain the only the same number of entries as there are tiles on the display. Thus, in this example, a complete FIFO queue would only need 20 entries to fully represent the entire display.

To enable the pruning process to operate on individual commands, the commands need to be able to be extracted from the update messages. Thus, for example, where the paint commands are encrypted, the paint commands should be individually encrypted to allow them to be individually removed from the update queue. Additionally, the positional information associated with the update commands should be able to be identified so that the area associated with the paint command may be identified. Thus, where the position information is transmitted using a bounding rectangle construct, the server may translate the bounding rectangle and the position of the paint command into screen coordinates that may be associated individually with the paint command. In the following description, an embodiment in which pruning is performed on a per-command basis will be described. The invention is not limited in this manner, however, as pruning may take place on a per-update message or another basis as well.

As mentioned above, transmission of individual paint commands and individual addressing of paint commands may not be the most efficient way of transmitting updated information from the host to the viewers. For example, in the embodiment discussed above, the notion of a bounding rectangle was introduced to allow a group of paint commands relating to contiguous tiles to be addressed collectively. This may be handled by causing the server to deconstruct the bounding rectangle to cause each paint command in the update queue to be individually addressed while in the queue. When the commands are grouped for transmission to the viewers, new groupings of commands may be formed and new bounding rectangles may be created to allow the server to convey positional information for the commands to the viewers.

When the server receives an update request from a viewer, it will send all the (unpruned) commands that it had received in the next unsent update. The commands may be grouped into a plurality of update messages containing commands from the requested update. However, between the time when the server receives the update from the host and receives a request to forward the update to a viewer, the server may have pruned some of the commands associated with that update. Thus, the update that is transmitted from the server to the viewer is guaranteed to be at most the same size as the update received from the host and, frequently, may be much smaller.

When copy commands are to be supported, which allows arbitrary sized areas of information to translate on the screen without requiring new pixel information for that source area to be transmitted, it is possible to create inter-dependencies between areas of the screen. Keeping track of this additional layer of complexity may be implemented through the use of a construct referred to herein as panes. Panes represent non-overlapping rectangular areas of display area and contain references to paint and copy commands that allows the system to keep track of which commands may be required to recreate a particular area of the display. The panes don't actually contain pixel data or other data that is to be displayed, but rather allow the system to keep track of which commands do contain such data and, hence, to keep track of which commands are necessary and which are not necessary. Where a command is referenced by a pane on the system, it is a necessary command and may not be pruned from the queue. Conversely, where a command is no longer referenced by any pane in the system, it may be assumed that the command is not required to recreate any portion of the screen and, hence, that it may be pruned from the update queue.

Panes may be any size and shape. For example, when an update message containing a sequence of paint commands is received, a series of panes may be created to reference the newly referenced paint commands. Where the paint commands do not reference uniform sized tiles, the panes created by the paint commands may be of arbitrary size depending on the size of the associated paint commands.

Figure 22:
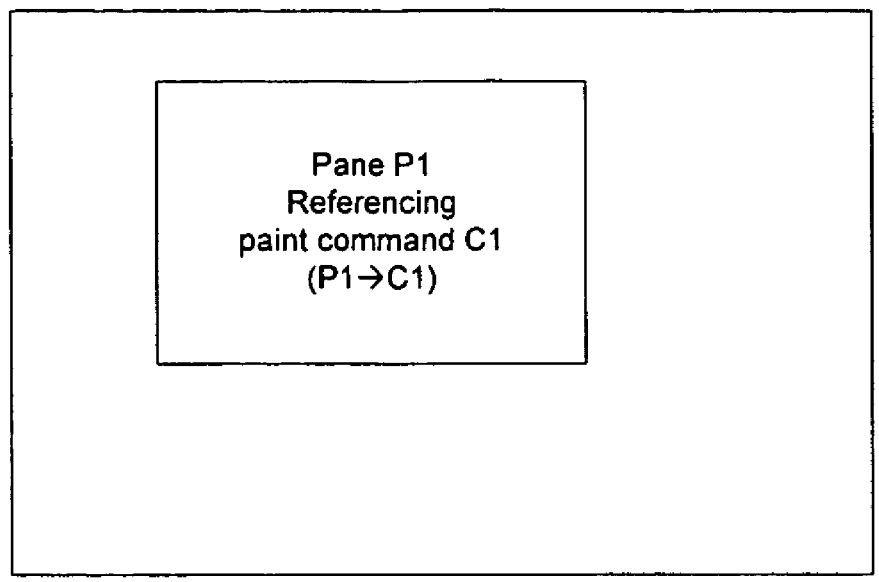
FIG. 22 is a functional block diagram illustrating a pane that may be created due to receipt of a paint command.
Figure 23:
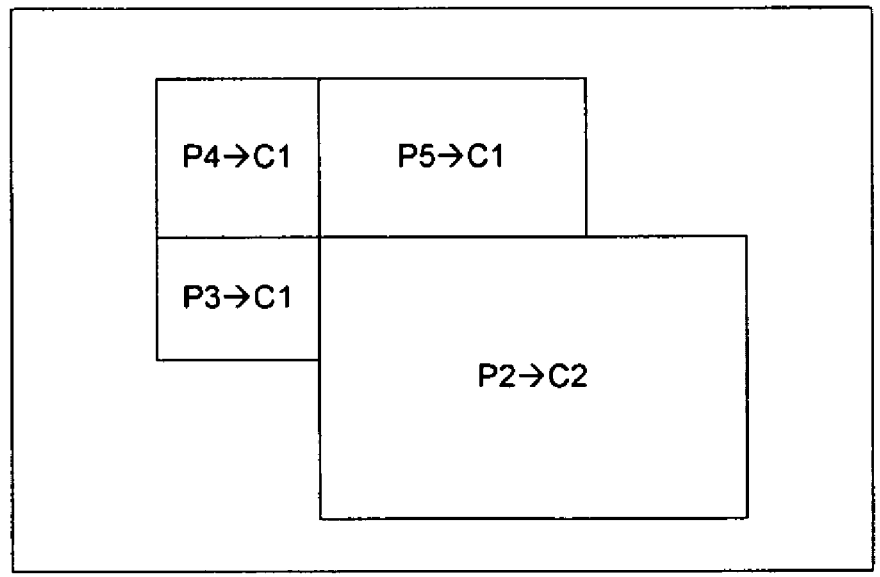
FIG. 23 is a functional block diagram illustrating the panes that are created as a second partially overlapping paint command is received.

Since a given area of the screen can only be referenced by one pane, receipt of a subsequent paint command that partially overlaps an earlier paint command may cause the earlier pane to be broken up into several smaller panes. For example, as shown in FIG. 22, when the first paint command C1 is received as shown in FIG. 23, it will cause pane P1 to be created with a reference to paint command C1. When a subsequent overlapping paint command C2 is received, it will cause a pane P2 to be created. Since pane P2 overlaps pane P1, pane P1 will be fractured into a number of smaller panes (P3-P5) surrounding the pane P2 and all containing references to command C1. As subsequent commands are received which cause new panes to be created, the smaller panes may be further fractured. When all panes referencing a particular update message are deleted, the update message is no longer needed to recreate the host display information and may be deleted. Similarly, when a pane is overwritten by a new pane or all commands referencing a pane are deleted, the pane is no longer necessary and may be deleted.

The use of variable sized paint commands causes multiple smaller panes to be created whenever the paint commands overlap. To mitigate this, paint commands and referencing display areas positioned along a fixed grid may be used. The grid may define areas of uniform size, although the invention is not limited in this manner. For example, the grid may have a grid pattern that has larger areas and smaller areas that are statically configured to appear in the same position on both the host and viewer displays. Using a fixed grid to generate the paint commands reduces the likelihood that paint commands will partially overlap other panes and cause pane fracturing.

While paint commands may be constructed to refer to an area which is of a fixed size, for example 16×16 or 32×32 pixels, and may be aligned to a fixed grid on the screen to minimize pane fracturing, copy commands are not as constrained. Indeed, a given copy command may specify a source area having an arbitrary size and position, and likewise specify a target area of arbitrary size and position. The source and target areas may be the same size, such as in those instances when the source area is directly copied to the target area, or may be different sizes, such as in those instances when the information contained in the source area is to be scaled in connection with movement to the target area.

A copy command need not specify a target area that is a part of the visible area of the screen, but may specify a memory location where the source content may be stored as an object until needed for future viewing. Similarly, the copy command source area may be an area of memory containing previously stored information that is to be moved to the visible portion of the screen. In this way, a copy command may be used to store and retrieve information to a local cache so that the information may be later recalled rather than retransmitted from the host. For example, when a window in the host's display is minimized, the content of a source area coincident with the window may be copied to a memory area so that, if the window is later made active, the content may be recalled from memory rather than being retransmitted from the host. Other types of information such as background information may be stored in the local cache as discussed in greater detail above. A second copy command may then be used to move the data from the local cache or other memory area to the target area of the display.

Figure 24:
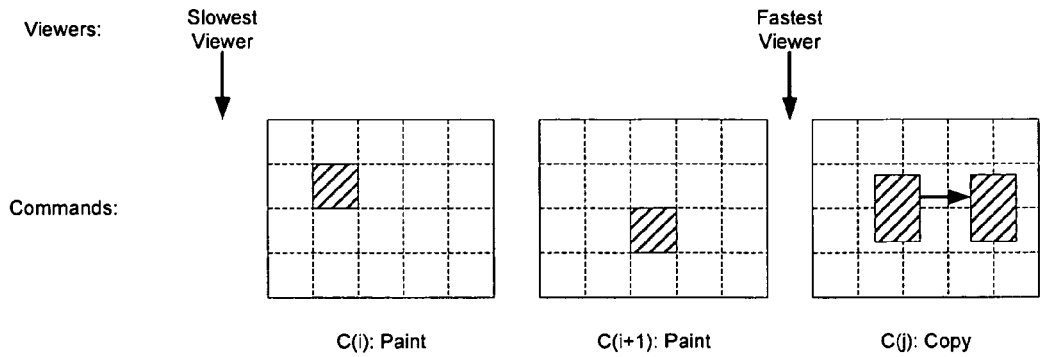
FIG. 24 is a functional block diagram illustrating commands in an update queue.

FIG. 24 illustrates a sequence of commands in an update queue. As shown in FIG. 24, as updates are received the server creates an ordered queue of commands C(0 . . . j). The order corresponds to the order in which the server received the commands from the host. For each command, the server either discards it (which can occur at any time after the command was received) or forwards it to the viewer(s) in the order in which it was received. So at any given time, the queue contains commands C(i . . . j) where i is probably not 0. Additionally, it may be assumed that the queue is usually not contiguous, meaning that at any given point in time one or more of the commands may have been pruned from the queue.

In addition to maintaining the queue, the server maintains a pointer for each viewer V(0 . . . u), where V(v) falls in the list C(i . . . j). The pointers V(0 . . . u) reference positions in the queue of commands so that the server may maintain references as to which commands have been forwarded to which viewers. As update requests are received from the viewers, groups of commands will be pulled from the update queue and used to generate update messages for transmission to the requesting viewers. As the update messages are created, new bounding rectangle constructs may be introduced to reduce the amount of positional information that must be transmitted between the server and the viewers.

Figure 25:
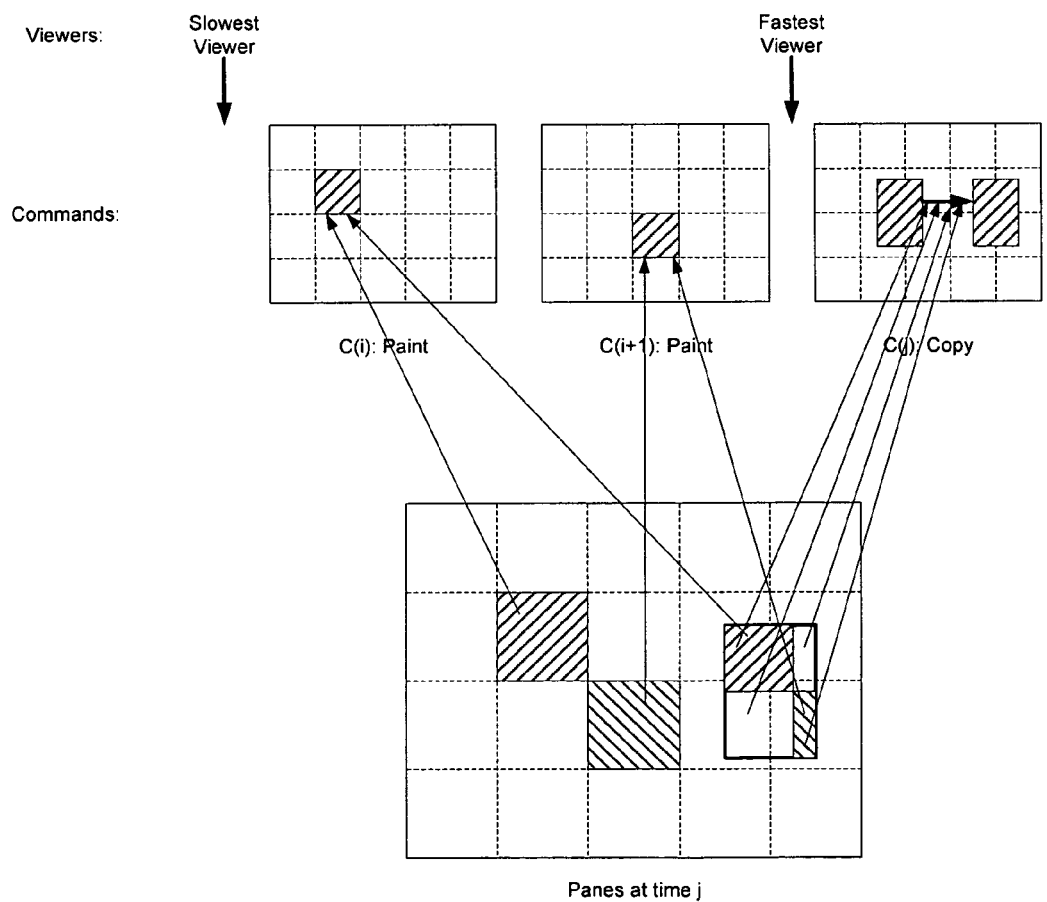
FIG. 25 is a functional block diagram illustrating panes that may be created in connection with the sequence of commands illustrated in FIG. 24.

Panes are particularly useful when a copy command causes part of a paint command to be used to recreate another portion of the screen. For example, a shown in FIG. 25, assume that three commands were received—a first paint command C(i), a second paint command C(i+1) and a copy command C(j). The copy command may cause part of the tiles painted by the first two paint commands to be moved to another location on the display. Thus, the panes created due to receipt of the copy command will reference both the paint command and the copy command. Thus, if a subsequent paint command C(j+1) is received, which completely overwrites the original location of the earlier command C(i), the subsequent command would not cause the earlier command C(i) to be removed from the queue since that command C(i) is still needed to recreate the portion of the tile that was moved.

Panes may be restricted in a number of ways to minimize pane fracturing. For example, according to one embodiment of the invention, panes may be restricted in such a way that they are not allowed to extend across grid lines associated with the tiles. By restricting the panes in this manner, the receipt of a paint command, which fits precisely within the grid, will not cause pane fracturing in neighboring grid areas. Additionally, this restriction will beneficially cause all other panes which may have been created within that grid area to be deleted. Specifically, when a paint command is received that corresponds to a grid square, a new pane is created and associated with that paint command. If there had previously been any panes in that grid square, they are deleted along with their references to other prior paint and copy commands.

By restricting a pane to not extend across a grid line, if a copy command causes a portion of the screen to be moved so that it only partially overlaps a grid square, a number of smaller panes will be drawn within the grid square, so that together the panes cover the entire grid square. If a pane is smaller than a grid square, then a number of panes will fit together to cover the grid square.

Figure 26:
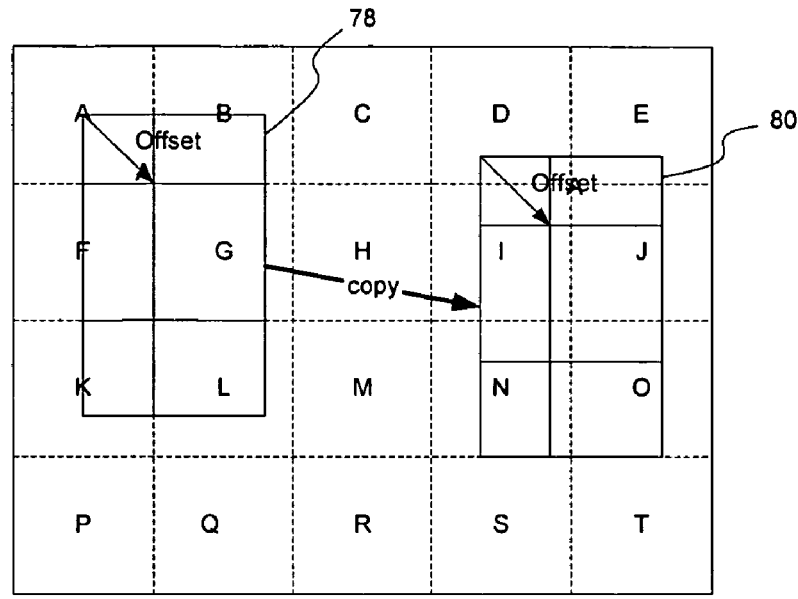
FIG. 26 is a functional block diagram illustrating an example copy command.
Figure 27:
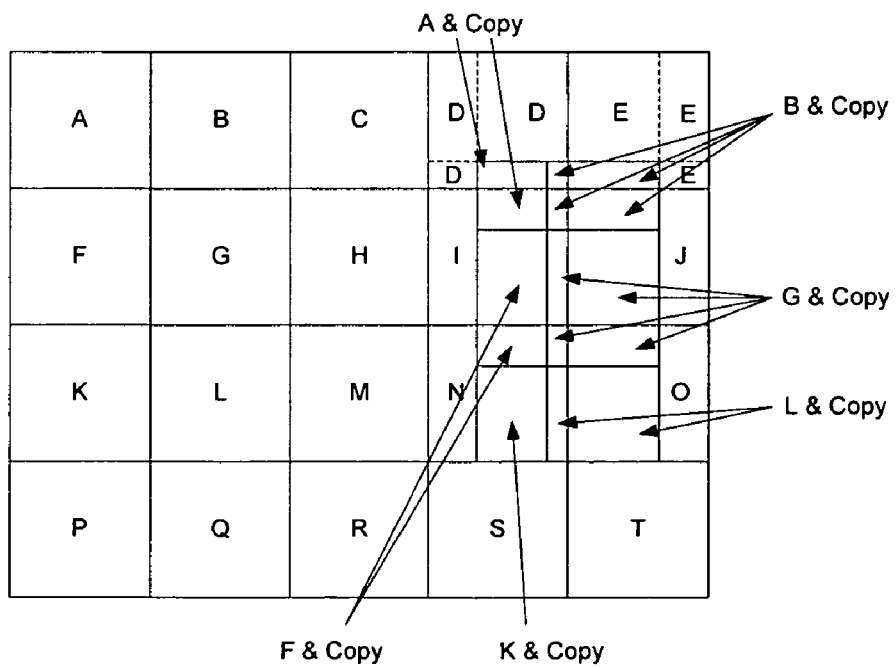
FIG. 27 is a functional block diagram illustrating panes that may be created in connection with the copy command of FIG. 26 according to an embodiment of the invention.

FIG. 26 illustrates a copy command in which a source area 78 is moved to a target area 80. The panes that are created by this command are shown in FIG. 27. In this example, it will be assumed that the display is initially covered by paint commands A-T. Since the paint commands were formed to be coincident with the grid lines, the panes before receipt of the copy command are coincident with the grid and are formed such that each grid square is represented by a single pane containing a pointer to the paint command A-T.

When the copy command is received, part of each of the tiles A, B, F, G, K, and L, are moved to overlap portions of tiles D, E, I, J, N, and O. As shown in FIG. 27, the copy command causes numerous panes to be created. Specifically, since panes cannot cross a grid boundary in this example, and since each pane must refer to the unique combination of commands that are required to recreate that portion of the display, the movement of the content from the source to the target area causes multiple smaller panes to be created. As shown in FIG. 27, the copy command causes two panes to be created that refer to paint command A and the copy command, four panes that refer to paint command B and the copy command, etc. In total, 15 new panes are created to maintain reference to those commands that are required to recreate the portion of the screen that has been moved. Additional fracturing of panes that are partially overwritten may occur as well. For example, since pane D was only partially overwritten, pane D is fractured into three smaller panes D' to allow the system to identify the three rectangular areas of the grid that require paint command D to be recreated. A similar process occurs with respect to pane E. Accordingly, copy commands often cause multiple panes to be generated, where each pane identifies those commands that are necessary and sufficient to recreate that area of the grid.

Panes can have two kinds of bi-directional pointers. Each pane can have a single pointer to the paint command that contains data to be displayed in that pane. Additionally, a pane can have one or more pointers to copy commands that describe where data originates that is needed to reconstruct that pane. The pane may, but need not, specify the part of the paint command that it displays, nor the details of how the copy commands moved data around, because, as noted, the purpose is not to reconstruct the screen from the panes, but rather to keep track of the necessary commands that can reconstruct the screen. Thus, the panes specify which paint and copy commands are necessary to generate the pixels in the pane and provide a mechanism for keeping track of which commands are necessary and which are no longer needed.

Since panes cannot straddle across gridlines, the panes can be organized according to the grid square where they are located. Thus, whenever it is necessary to search for all panes that reference a given command, the search may be carried out on only those panes within that grid square, rather than for all panes.

Once the server has sent a command to all the viewers, it may delete the command from the update queue and delete references to it from any associated panes. Once a pane contains no pointers to any commands, it may be deleted. The bi-directionality of the pointers allows the panes associated with a particular command to be identified efficiently.

There are several ways to send an initial full screen to a new viewer when it joins a session in progress. For example, the server may request a complete screen update from the host. In this case, the host will then send a full set of paint commands that cover the entire screen. These paint commands replace all the commands in the server's queue and will be sent to all the viewers, even though they will generally be redundant to information contained by many of the viewers already participating on the session. While this may cause some redundant information to be sent to the existing viewers, it will also serve to eliminate any fractured panes which may accelerate processing of updates and reduce the length of the queue. However, sending a complete set of tiles to all viewers can be highly bandwidth inefficient and perceptually disruptive as it may take up to several seconds (even over a relatively high speed connection) to send a full update to all viewers when a new viewer joins the session. When viewers frequently join or rejoin a session, a disruption of this nature may be undesirable.

Alternatively, the server may maintain commands for a longer period of time, even after it has sent the commands to all the viewers, so that those commands may be used at a later time in the event that a new viewer joins the session or an existing viewer needs to reestablish a connection to the session. In this embodiment, the server continues to run the pruning algorithm on the commands that have been previously sent to the existing viewers, so that the old commands get pruned away and the steady state of the queue tends toward having a full set of paint commands that cover the entire screen. This approach keeps more state information in the update queue than the previous embodiment, since the update queue will contain a full complement of commands required to recreate the entire display, and thus requires more server memory and processing resources. However, when a new viewer joins the session, the server simply places the new viewer at the back of the queue and starts sending the set of commands to the new viewer. The new viewer receives approximately the same amount of data as in the previous approach, but the host and the existing viewers are not disrupted as viewers join and rejoin sessions.

The invention is not limited to a particular implementation as to how the server should cache information to enable viewers to join on-going sessions, since the decision as to which approach to take may depend on user preferences and the type of resources available at the server. For example, the decision as to how the queue should be structured may depend on how often viewers join a session and how objectionable it is to disrupt the session to allow new viewers to catch up to the existing viewers. The decision may also be affected by efficiency with which the update queue gets pruned since the bigger the queue tends to be, the more delay the new viewer will experience before it catches up to the other viewers.

The pane pruning process described herein in connection with the embodiment described above may be implemented using the following pseudo code. The invention is not limited to this particular example, however, as other processes may be used as well.

Create Session
    The server creates a queue of commands C(i . . . j) for the session
        The queue is initially empty, and the back and head of the queue are the same New Viewer V Joins the Session
    The server places the viewer at the back of the queue
        Pointer V(v) is set to the back of the queue, usually C(i)
        If the queue is empty, then V(v) points to the head of the queue The Server Receives a Request for an Update from a Viewer W
    If pointer V(w) points to the head of the queue (or to another position close to the head of the queue such as one or two updates away from the head of the queue)
        The server sends a request for an update to the host The server remembers that viewer W is waiting for the update, and will start sending update messages once update messages associated with the update are received from the host If pointer V(w) does not point to the head of the queue
  The server copies a series of commands from the queue starting at position V(w) that were received in the same update and creates a new update message using those commands, then moves V(w) to reflect the number of commands it copied to generate the update message and sends the newly created update message to viewer W.

The Server Receives an Update Message from the Host.
  The server breaks up the update message into commands, and processes the commands one at a time in the sequence in which they are received.
  For each paint command:
    For each pane P(p) covered by the paint command
      Remove pane P(p) and remove all pointers from pane P(p) to commands C(i . . . j) referenced by that pane (Since panes are at most the size of one grid area, a paint command never covers only part of a pane.)
      If an affected command C(i) is no longer referenced by any pane, then remove C(i) from the queue
    Add the paint command to the queue of commands C(j+1) and note the update in which the command was received.
    Create a new pane P(q) in the same grid position as the paint command, with a single pointer to the paint command
  For each copy command referencing source and destination areas (Rs, Rd)
    For each pane P(p) intersecting Rs
      Create a new pane that corresponds to the overlap between Rs and P(p). Call this new pane CR(k), so pane CR(k) has an offset within Rs, referred to as Offset(k)
      Copy P(p)'s pointers to CR(k)
      Add a pointer from pane CR(k) to the copy command
    For each pane P(p) intersecting Rd
      If the destination area Rd covers pane P(p)
        Remove pane P(p) and remove all pointers from pane P(p) to commands C(i . . . j)
        If an affected command C(i) then has no more pointer from any panes, then remove C(i)
      If the destination area Rd covers only part of pane P(p)
        Subtract the area described by Rd from pane P(p), this creates a number of new panes P(q+1 . . . q+r). Each of these new panes receives a copy of pane P(p)'s pointers to the commands
      Add copy command (Rs, Rd) to the list of commands C(m+1) and note the update in which the copy command was received.
      Possibly split up each pane CR(k) into multiple panes
        Pane CR(k)'s destination position is position Rd+Offset(k)
        If pane CR(k) crosses a grid line, then split pane CR(k) into multiple panes CR(k') . . . CR(k") so that they do not cross grid lines
      Add all the newly created panes CR(k'). CR(k") to the list of panes P(n . . . m)
  If any viewers W . . . Z were waiting for an update, create update messages for transmission to the viewers.

Although the pruning algorithm discussed above may be used to reduce the amount of information that must be transmitted to the viewers, this process is not the only process that may be used to do so. Rather, multiple processes may be used. The following description provides details of an alternative process that may be used to prune information from a queue of information to be downloaded to one or more viewers on a session. This process may be able to reduce the number of panes generated by the copy commands described above.

As discussed above, in the general situation, it is often not possible to be certain that a paint command is not necessary. For example, a portion of a tile referenced by a paint command may have been copied using a copy command, a new paint command referencing the same tile may have been received and the target area of the copy command may have been subsequently covered by one or more new paint or copy commands. The use of panes simplifies the process of determining which commands are required to be kept in the update queue by interjecting a condition that indicates which commands are necessary and sufficient to create a given area of the display. Specifically, by allowing smaller panes to be created within a given tile area, it is possible to create an environment in which there is no ambiguity between panes and commands. However, this may result in the creation of a large number of panes, for example as shown in FIG. 27. According to another embodiment of the invention, the dependency between commands and panes creates a sufficient but maybe not necessary relationship in which it is clear that the list of commands referenced by a pane will recreate the portion of the screen represented by the pane, but not all of the commands may be necessary to recreate that portion of the screen. Thus, in this embodiment, a pane may refer to more commands than are required to actually recreate the portion of the screen. However, the number of panes used to refer to the screen may be reduced to coincide with the number of tiles used to generate the screen.

Figure 28:
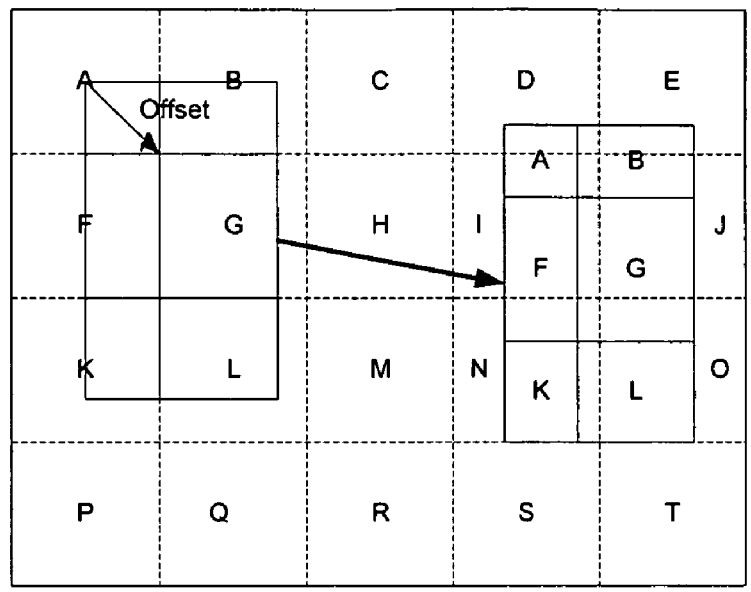
FIG. 28 is a functional block diagram illustrating an example copy command.
Figure 29:
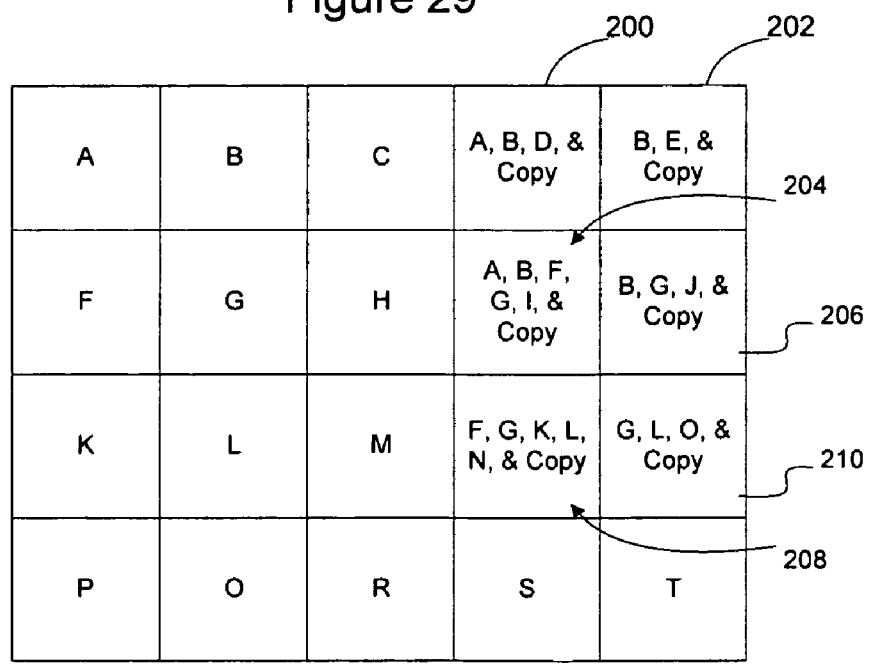
FIG. 29 is a functional block diagram illustrating panes that may be created in connection with the copy command of FIG. 28 according to another embodiment of the invention.

Specifically, in this embodiment, a fixed number of panes are used to represent the grid of tiles, which makes pane processing much simpler, since there is a limited number of panes to reference at any point in time. FIGS. 28 and 29 illustrate an example of how the pane references change in connection with a copy command. In this embodiment, each pane refers to the commands that may be needed to paint the display in the area represented by that pane, but panes in this embodiment don't maintain positional information associated with how the commands relate to sub-portions of the area of the screen referred to by the pane.

FIGS. 28 and 29 illustrate an example copy command and the way in which the panes are impacted by receipt of the copy command. As shown in FIG. 28, when the source area is moved to the target area, a portion of paint command A will be required to recreate the area of the screen in grid areas D and I, paint command B will be required to recreate grid areas D, E, I, and J, etc. Since panes in this embodiment are constrained in size to be coincident with the grid, the panes will be updated to refer to those paint commands that are required to recreate any portion of the grid square. Thus, the panes will be changed such that pane 200 references paint commands A, B, D, and the copy command, pane 202 references paint commands B, E, and the copy command, pane 204 references paint commands A, B, F, G, I, and the copy command, pane 206 references paint commands B, G, J, and the copy command, pane 208 references paint commands F, G, K, L, N, and the copy command, and pane 210 references paint commands G, L, O, and the copy command.

As shown in FIG. 29, a copy command in this embodiment does not cause multiple panes to be generated, but rather causes numerous command references to be added to the fixed panes. As other copy commands are received, additional references will be added to the panes as well so that the panes may refer to a larger number of commands. The position information as to which commands are required to recreate which portion of the pane is not maintained by the pane construct, however, since the pane references a fixed area and merely maintains a number of pointers to commands that may be required to recreate any portion of the grid area.

The following pseudo code describes an implementation of this embodiment. The invention is not limited to the embodiment described in the following pseudo code, however, as many variations may be implemented.

Create Session
   The server creates a queue of commands C(i . . . j) for the session
      The queue is initially empty, and the back and head of the queue are the same New Viewer V Joins the Session
   The server places the viewer at the back of the queue
      Pointer V(v) is set to the back of the queue, usually C(i)
      If the queue is empty, then V(v) is also pointing to the head of the queue The Server Receives a Request for an Update from Viewer W
   If V(w) is pointing to the head of the queue
      The server sends a request for an update to the host
      The server remembers that viewer w is waiting for the update
   If V(w) in not pointing to the head of the queue
      The server copies commands from the queue starting at position V(w) that were received in the same update and creates a series of update messages to be transmitted to the viewer W, then moves the pointer V(w) forward in the queue to reflect the number of commands that have been copied to be sent to the viewer.
      The server sends the update messages to the viewer W.

The Server Receives an Update from the Host.
   The server breaks up the update into commands, and processes the commands one at a time in the sequence in which they are received.
   For each paint command R
      Find the pane P(p) that is covered up by the paint command R (Note that there is exactly one pane that is covered up by any paint command)
         Remove all pointers from pane P(p) to other commands C(i . . . j)
            If, as a result of the removal of the pointers from the pane P(p) an affected command C(i) has no more pointers from any panes, then remove command C(i) from the queue
      Add a pointer from Pane P(p) to command R
      Add command R to the queue of commands C(j+1) and note the update in which command R was received.
   If the command is a copy command referencing source and destination areas (Rs, Rd)
      For each pane P(p) intersecting the source area Rs
         Calculate the offset of each pane P(p) within the source area Rs, call them P(q)
      For each pane P(p) intersecting the destination area Rd
         If Rd covers pane P(p) completely, then remove all pointers from that pane P(p) to commands C(i . . . j)
            If as a result an affected command C(i) has no more pointers from any panes, then remove C(i)
      For each pane P(p) intersecting destination area Rd, regardless whether destination area Rd covers the pane P(p) completely or not
         For each pane in source area Rs, called P(q), that intersects pane P(p), add all the command references from P(q) to P(p)
      dd copy command (Rs, Rd) to the list of commands C(m+1) and note the update in which the copy command was received
   If any viewers W . . . Z were waiting for an update, create update messages for transmission to the viewers.

As discussed above, this embodiment may leave some commands in the queue that instead should be pruned, because the panes reference all commands that may affect the grid square associated with that pane, but do not keep track of what part of the grid square is affected by a given command. Thus, commands reference by a pane may or may not be required to recreate the area of the display represented by the pane.

Although the positional information required to determine which commands are necessary is not available in the pane in this embodiment, it is available in the commands themselves. Thus, an improvement to this embodiment may be to identify any command references that could be removed from a pane by looking at all the commands that are referenced by that pane and, using this positional information provided by the commands, to eliminate reference to unnecessary commands. Reviewing positional information associated with commands referenced by a pane will be referred to herein as "second pass processing." The use of the second pass processing procedure enables unnecessary commands to be removed from the queue while allowing the pruning process to be logically separated into two sub-processes—a first pass process in which references are added to panes, and a second pass process in which obsolete references are removed from the pane.

There may be several ways to perform the second pass processing procedure. For example, whenever the server adds a reference to a second (or third . . . ) copy command to a pane, it can mark the pane as possibly needing second pass processing. A background process scans through all the panes for those that are possibly in need of second pass processing. For every such pane, the process looks at each command referenced in that pane in queue order (chronological order) and runs it through a second pass algorithm within the area of the pane's grid square. That is, the process may create multiple small temporary panes of arbitrary sizes (all smaller than the grid square) each of which only refers to a single paint command, and delete panes that are covered by later paint commands. When all paint commands have been considered, only the commands that are still referenced by the small temporary panes will be retained, and all others may be deleted from the pane being processed. The remaining small temporary panes may also be discarded. The original pane is then marked as no longer needing second pass processing. The second pass processing procedure may thus use a procedure similar to that described above with respect to FIGS. 24-27 to determine which commands are actually required to recreate the area of the display represented by the pane. The second pass processing procedure may be performed on a single pane or on groups of contiguous panes at the time.

The second pass processing procedure may be relatively computationally intensive. Since the pruning process may run less efficiently without implementation of the second pass processing procedure, it is desirable to cause this aspect of the pruning process to run when sufficient processor resources are available. However, since it is possible to run the RVS software without implementing the second pass processing procedure, the pruning process may be implemented such that the second pass processing procedure is designed to be run in the background and at a lower priority. This will cause the second pass processing portion of the process to be performed only when sufficient processing capacity/resources are available.

Running the second pass processing procedure separately from the primary pruning process thus enables the system to degrade gracefully as the load on the server increases. Specifically, as long as the server is lightly loaded and cycles are plentiful, both parts of the pruning process may execute. If, for whatever reason, the server is heavily loaded, then the second pass processing procedure may be suspended to enable the server resources to be used in connection with the primary pruning process. Alternatively, thresholds may be implemented to enable the second pass processing procedure to selectively process only those panes that are most likely in need of second pass processing. For example, the second pass processing procedure may be configured to process panes referring to the largest number of commands first, since those panes are most likely to benefit from the second pass processing procedure, and to process other panes in order of the number of referenced commands, or in the order of the number of copy commands. By doing this, the panes with the largest number of commands, or largest number of copy commands, may be processed preferentially as processing cycles are made available on the server. This allows the second pass processing procedure to focus on those panes most in need of second pass processing while enabling the server to remain focused primarily on running the primary pruning process.

Host RVS Software

Figure 30:
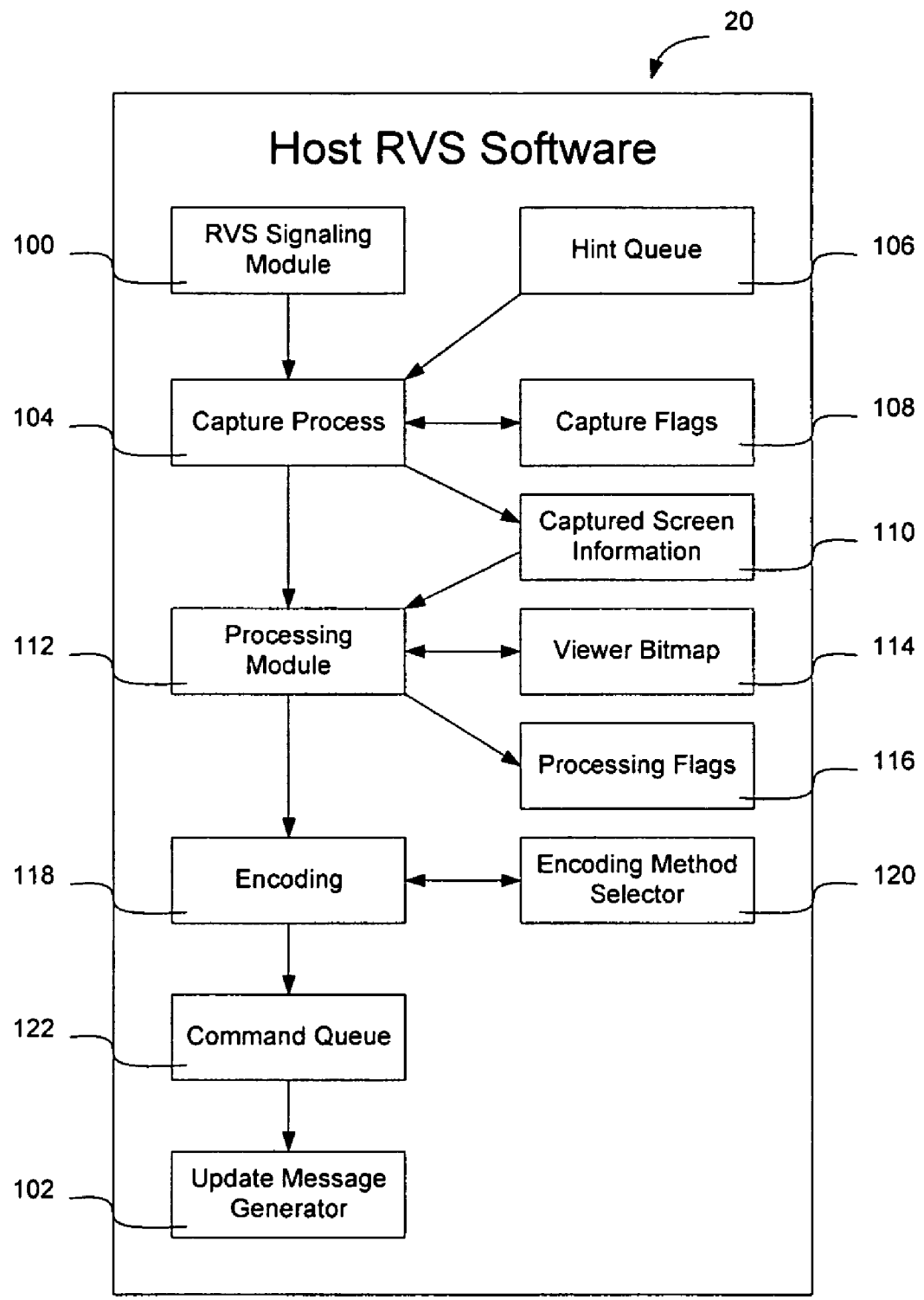
FIG. 30 is a functional block diagram illustrating host RVS software according to an embodiment of the invention.

FIG. 30 illustrates an example of host RVS software that may be utilized to implement an embodiment of the invention by causing a host computer to implement aspects of the methods described herein. As shown in FIG. 30, the host RVS software has an RVS signaling module 100 configured to formulate messages using the message format described in part III hereof. Similarly, the host RVS software has an update message generator 102 that may be formed as part of the RVS signaling module 100 or as a separate module, and which is configured to generate update messages.

The host RVS software also includes a capture process module 104 configured to obtain information from a hint queue 106, capture screen information associated with the received hints, and update capture flags 108 to keep track of which portions of the host display have been captured in connection with generation of a particular update. Captured information is stored in a captured screen information module 110 which may be an interface to shared memory or a dedicated memory area allocated to store the captured screen information.

The host RVS software also includes a processing module 112 configured to operate on captured screen information retrieved from the captured screen information module 110 to compare the captured screen information with a viewer bitmap 114 and generate updates where there is a detectable difference. The processing module 112 may maintain a record of which areas of the screen have been processed using an array of processing flags stored in processing flag module 116.

The host RVS software also includes an encoding module 118 configured to encode update paint commands prior to transmission to the remote viewing service or viewers. The encoding module 118 interfaces with an encoding method selector 120 configured to select an appropriate encoding method for each paint command or for groups of paint commands. Optionally, the encoding method selector 120 may be incorporated with the encoding module 118.

The host RVS software may optionally include a command queue 122 configured to hold encoded paint commands and copy commands, prior to inclusion in an update message by the update message generator 102. Although an embodiment of RVS software has been described, other functional modules may be included as well and the invention is not limited to an embodiment that includes all of these modules or to an embodiment in which modules are implemented that are configured to perform these specific functions.

The methods described herein may be implemented as software configured to be executed in the control logic such as contained in a CPU of an electronic device such as a computer. In particular, the RVS software or portions of the RVS software may be implemented as a set of program instructions that are stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

It also should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of identifying changed host display information on a host display, the method comprising the steps of:
    logically dividing the host display into a grid of tiles, each of the tiles representing a portion of the host display
    receiving a plurality of hints from hint sources, at least some of the hint sources being associated with processes generating the host display information;
    creating tile associations for the hints, the tile associations specifying which tiles are associated with each of the hints, at least some of the hints being associated with multiple tiles;
    storing at least a subset of the plurality of hints in a hint queue; and
    processing the hints;
    wherein the hint sources comprise a windows hook dll configured to intercept paint messages, window position messages, and user input messages, a foreground window polling process configured to determine if the front window has moved or changed, and a mirror display driver configured to detect areas of the screen that applications have drawn on and generate hints accordingly.

2. The method of claim 1, wherein the step of processing the hints comprises consolidating hints from the hint queue to a consolidated hint queue, said step of consolidating hints into the consolidated hint queue comprises determining whether a previous hint already in the consolidated hint queue is associated with the tile that is associated with the new hint.

3. The method of claim 2, further comprising at least one of the step of not storing the new hint in the consolidated hint queue when both the new hint and previous hint are associated with the same tile, and the step of removing the previous hint from the consolidated hint queue when both the new hint and previous hint are associated with the same tile.

4. The method of claim 2, further comprising, upon receipt of an instruction to move a portion of the display from a source location to a target location, the step of changing the tile associations for hints in the consolidated hint queue associated with the source location.

5. The method of claim 2, wherein the hint queue is configured to maintain the ordering of hints, and wherein the step of consolidating hints into the consolidated hint queue comprises ordering the hints into processing order.

6. The method of claim 1, wherein the step of processing the hints in the hint queue comprises:
 determining which tiles are referenced by hints in at least one of the hint queue and a consolidated hint queue;
 capturing screen information encompassing an area of the screen associated with the referenced tiles; and
 comparing the captured screen information with previous captured screen information for the referenced tiles.

7. The method of claim 6, wherein the steps of determining, capturing, and comparing occurs on a hint-by-hint basis.

8. The method of claim 1, wherein the step of processing the hints comprises, for each hint:
 determining a screen area associated with the hint; and
 determining whether the screen area has been processed.

9. The method of claim 8, wherein the step of processing the hints further comprising the steps of:
 if the screen area has not been processed, determining whether the screen area has been captured; and
 if the screen area has not been captured, capturing the screen area.

10. The method of claim 9, wherein the step of processing the hints further comprises comparing a portion of the captured screen area encompassing the screen area associated with the hint with a previous version of the same screen area to determine if the screen area has changed.

11. The method of claim 10, further comprising the steps of determining, for each tile, which of at least two encoding processes will more effectively encode the tile, and encoding the tile using the selected encoding process.

12. The method of claim 11, wherein the step of determining which of at least two encoding processes will more effectively encode the tile comprises counting a number of colors in the tile to be encoded.

13. The method of claim 11, wherein the encoding processes comprise at least ZLIB and JPEG.

14. The method of claim 10, wherein the step of comparing the captured screen area with a previous version occurs on a tile-by-tile basis.

15. The method of claim 9, further comprising the steps of maintaining a record of which areas of the screen have been captured using an array of screen capture flags, and maintaining a record of which tiles have been processed using an array of tile processing flags.

16. The method of claim 1, wherein the hint sources further comprise a display driver configured to interface with a display card.

17. The method of claim 1, wherein the step of processing the hints occurs upon receipt of an update request.

* * * * *